(12) United States Patent
Kimura et al.

(10) Patent No.: US 7,463,570 B2
(45) Date of Patent: Dec. 9, 2008

(54) MULTI-FOCUS OBJECTIVE LENS, OPTICAL PICKUP APPARATUS AND OPTICAL INFORMATION RECORDING REPRODUCING APPARATUS

(75) Inventors: Tohru Kimura, Hachioji (JP); Junji Hashimura, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 775 days.

(21) Appl. No.: 11/098,842

(22) Filed: Apr. 4, 2005

(65) Prior Publication Data

US 2005/0226123 A1 Oct. 13, 2005

(30) Foreign Application Priority Data

Apr. 8, 2004 (JP) ............... 2004-114259

(51) Int. Cl.
*G11B 7/00* (2006.01)
(52) U.S. Cl. ............... 369/112.23; 369/112.24; 369/112.25; 369/112.07; 369/112.08
(58) Field of Classification Search ............... 369/112.23–112.26, 112.08, 112.13, 112.05
See application file for complete search history.

(56) References Cited

U.S. PATENT DOCUMENTS

| | | | | |
|---|---|---|---|---|
| 6,987,615 B2* | 1/2006 | Shiono et al. | ............ | 369/44.23 |
| 7,200,079 B2* | 4/2007 | Ikenaka et al. | ......... | 369/112.23 |
| 7,206,276 B2* | 4/2007 | Kimura et al. | ......... | 369/112.08 |
| 7,245,407 B2* | 7/2007 | Komma | .......... | 369/112.05 |
| 7,280,444 B2* | 10/2007 | Arai et al. | ........... | 369/44.23 |
| 7,369,481 B2* | 5/2008 | Kimura et al. | ......... | 369/112.23 |
| 2003/0235137 A1 | 12/2003 | Nishioka et al. | | |
| 2004/0160885 A1* | 8/2004 | Kimura | .......... | 369/112.09 |
| 2004/0170106 A1* | 9/2004 | Komma | .......... | 369/112.1 |
| 2005/0007934 A1 | 1/2005 | Ohta | | |

FOREIGN PATENT DOCUMENTS

| | | |
|---|---|---|
| EP | 1 202 259 | 5/2002 |
| EP | 1 372 147 | 12/2003 |
| WO | WO 2004/095443 | 11/2004 |

* cited by examiner

*Primary Examiner*—Thang V Tran
(74) *Attorney, Agent, or Firm*—Cohen Pontani Lieberman & Pavane LLP

(57) ABSTRACT

A multi-focal objective lens for use in an optical pickup apparatus for recording and/or reproducing information using a first light flux with a wavelength $\lambda_1$ on a first and second optical discs, includes a first optical surface including a first diffractive structure. The multi-focal objective lens converges a diffracted light flux with one of the m-th diffraction order and the n-th diffraction order on an information recording surface of the first optical disc for recording and/or reproducing information of the first optical disc, and converges a diffracted light flux with another of the m-th diffraction order and the n-th diffraction order on an information recording surface of the second optical disc for recording and/or reproducing information of the second optical disc.

62 Claims, 8 Drawing Sheets

OPTICAL AXIS

OPTICAL AXIS

OPTICAL AXIS

OPTICAL AXIS

OPTICAL AXIS

OPTICAL AXIS

MULTI-FOCUS OBJECTIVE LENS, OPTICAL PICKUP APPARATUS AND OPTICAL INFORMATION RECORDING REPRODUCING APPARATUS

This application is based on Japanese Patent Application No. 2004-114259 filed on Apr. 8, 2004 in Japanese Patent Office, the entire content of which is hereby incorporated by reference.

FIELD OF THE INVENTION

The present invention relates to a multi-focus objective lens, optical pickup apparatus and optical information recording reproducing apparatus.

BACKGROUND OF THE INVENTION

Recently, in the optical pickup apparatus, the wave-length-shortening of the laser light source used as the light source for reproducing of the information recorded in an optical disc or recording of the information in the optical disc is advanced. For example, a laser light source of wavelength 405 nm such as a blue-violet semiconductor laser, or a blue-violet SHG laser which conducts the wavelength conversion of the infra-red semiconductor laser by using the second harmonic wave generation is putting to a practical use.

Using these blue-violet laser light sources enables an objective lens with the same numerical aperture (NA) as DVD (Digital Versatile Disc) to record the information of 15-20 GB in an optical disc of diameter 12 cm, and enables an objective lens whose NA is increased to 0.85 to record the information of 23-25 GB in the optical disc of diameter 12 cm. Hereinafter, in the present specification, the optical disc and photo-magnetic disc for which the blue-violet laser light source is used, are generally referred as "high density optical disc".

Hereupon, as the high density optical disc, presently, 2 standards are proposed. One of them is the Blu-ray disc (hereinafter, BD) which uses the objective lens of NA 0.85, and whose protective layer thickness is 0.1 mm, and another one is the HD DVD (hereinafter, HD) which uses the objective lens of NA 0.65 to 0.67, and whose protective layer thickness is 0.6 mm. When referring to the possibility that, in future, the high density optical discs of these 2 standards are distributed in the market, a high density optical disc player and/or recorder which enables to record and/or reproduce on any high density optical disc similarly, is desired.

Each of the following Patent Documents 1 and 2 shows 2-focal objective lens which can compatibly record and/or reproduce information on 2 kinds of optical discs whose protective layer thickness are different from each other, and light source wavelengths are the same.

In the 2-focal objective lens disclosed in 2 Patent Documents, when a large amount of light amount of the incident light flux is distributed to 2 focus by the diffractive structure formed on the lens surface, the recording and/or reproducing of the optical discs whose protective layer thickness are different from each other is conducted.

[Patent Document 1] Tokkaihei No. 9-179020
[Patent Document 2] Tokkaihei No. 9-120027

However, the above 2-focal objective lens is designed on the assumption that information is to be recorded and/or reproduced on the optical disc such DVD whose NA is 0.6 and Compact Disc (hereinafter, CD) whose NA is 0.45 is an subject of the information recording and/or reproducing, and it is difficult that the above 2-focal objective lens records and/or reproduces information on each of BD and HD, whose NA is large.

SUMMARY OF THE INVENTION

As a problem of the present invention, the above problem is considered, and an object of the present invention is to provide a multi-focal objective lens by which the focus can be formed on the information recording surfaces of the high density optical discs of 2 standards in which the protective layer thickness are different from each other, an optical pickup apparatus using it, and an optical information recording reproducing apparatus.

In the present specification, the optical disc using the blue-violet semiconductor laser or blue-violet SHG laser as the light source for recording and/or reproducing of the information is generally referred as "high-density optical disc", and the high-density optical disc includes the standardized optical disc on which information is recorded and/or reproduced by the objective lens of NA 0.85 and whose thickness of the protective layer is 0.1 mm (for example, BD), and the standardized optical disc on which information is recorded and/or reproduced by the objective lens with NA of 0.65 to 0.67 and whose thickness of the protective layer is 0.6 mm (for example, HD DVD). Further, additionally to the optical discs having such protective layers on their recording surfaces, the optical disc having the protective layer of the thickness of about several—several tens nm on the information recording surface, or the optical disc whose thickness of the protective layer or protective film is 0, is also included therein. Further, in the present specification, the high-density optical disc also includes the photo-electromagnetic disc using the blue-violet laser light source as the light source for the recording and/or reproducing of the information.

In the present specification, DVD is a general name of the optical discs of DVD series such as DVD-ROM, DVD-Video, DVD-Audio, DVD-RAM, DVD±R, DVD±RW, DVD+R, DVD±RW, and CD is a general name of the optical discs of CD series such as CD-ROM, CD-Audio, CD-Video, CD-R, CD-RW.

To solve the above problem, a structure written in Item 1 provides a multi-focal objective lens for use in an optical pickup apparatus for recording and/or reproducing information using a first light flux with a wavelength $\lambda_1$ ($\lambda_1 \leq 450$ nm) on a first optical disc with a protective layer with a thickness $t_1$ and a second optical disc with a protective layer with a thickness $t_2$ ($t_1 < t_2$). The multi-focal objective lens has a first optical surface including a first diffractive structure which has a plurality of ring-shaped zones and generates a m-th diffracted light flux and a n-th diffracted light flux (m≠n) from the first light flux entering into the first diffractive structure. Each of the plurality of ring-shaped zones is divided by steps, the multi-focal objective lens converges a diffracted light flux with one of the m-th diffraction order and the n-th diffraction order on an information recording surface of the first optical disc for recording and/or reproducing information of the first optical disc. The multi-focal objective lens further converges a diffracted light flux with another of the m-th diffraction order and the n-th diffraction order on an information recording surface of the second optical disc for recording and/or reproducing information of the second optical disc.

In the present invention, it is preferable that any one of the following structures is used as a diffractive structure: as typically shown in FIG. 1(a), FIG. 1(b), the structure which includes a plurality of ring-shaped zones 100, and whose cross sectional shape including the optical axis is serrated shape; as typically shown in FIG. 2(*a*), FIG. 2(*b*), a structure which includes a plurality of ring-shaped zones 100 in which a direction of a step 101 is the same within the effective diameter, and whose cross sectional shape including the optical axis is stepped-shape; as typically shown in FIG. 3(*a*), FIG. 3(*b*), a structure which includes a plurality of ring-shaped zones 103 inside of which a step structure is formed; or, as typically shown in FIG. 4(*a*), FIG. 4(*b*), a structure which is structured by a plurality of ring-shaped zones 105 in which a direction of the step is changed on the mid-way of the effective diameter, and whose sectional shape including the optical axis is step shape. Hereupon, FIG. 1(*a*) to FIG. 4(*b*) are views typically showing a cases where the diffractive structure is formed on a plane, however, the diffractive structure may also be formed on the spherical surface or aspheric surface. Further, in the diffractive structure in FIG. 3(*a*), FIG. 3(*b*), a case where each ring-shaped zone is divided into 5 is shown, however, the number of divisions of each ring-shaped zone is not limited to this.

Hereupon, in the present specification, a diffractive structure structured by a plurality of ring-shaped zones as shown in FIG. 1(*a*), FIG. 1(*b*), FIG. 2(*a*), FIG. 2(*b*), and FIG. 4(*a*), FIG. 4(*b*), is expressed by a sign "DOE", and a diffractive structure structured by a plurality of ring-shaped zones inside of which a step structure is formed, as shown in FIG. 3(*a*), FIG. 3(*b*), is expressed by a sign "HOE".

Further, in the present specification, an "objective lens" indicates an optical system including at least the light converging element which is arranged at a position facing the optical disc in the optical pickup apparatus, and which has a function to converge the light fluxes emitted from the light source whose wavelengths are different from each other on respective information recording surfaces of the optical discs whose recording densities are different from each other. The objective optical system may also be structured only by a light converging element, and in such a case, the diffractive structure is formed on the optical surface of the light converging element.

Furthermore, when there is provided an optical element which is integrated with the light converging element and actuated for the tracking and focusing by the actuator, the objective lens includes the optical system structured by these optical element and light converging element. When the objective lens is structured by a plurality of optical elements in such a manner, the diffractive structure may also be formed on the optical surface of the light converging element. However, in order to decrease the influence of the eclipse of the light flux by the step portion of the diffractive structure, it is preferable that the diffractive structure is formed on the optical surface of the optical element other than the light converging element.

BRIEF DESCRIPTION OF THE DRAWINGS

Each of FIGS. 1(*a*) and 1(*b*) is side view showing an example of a diffractive structure DOE.

Each of FIGS. 2(*a*) and 2(*b*) is side view showing an example of a diffractive structure DOE.

Figure 1:
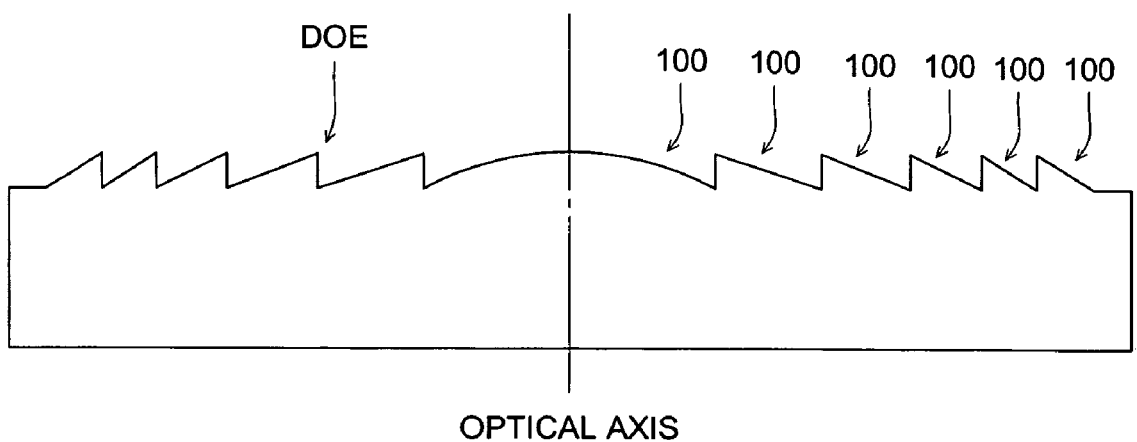
Figure 1:
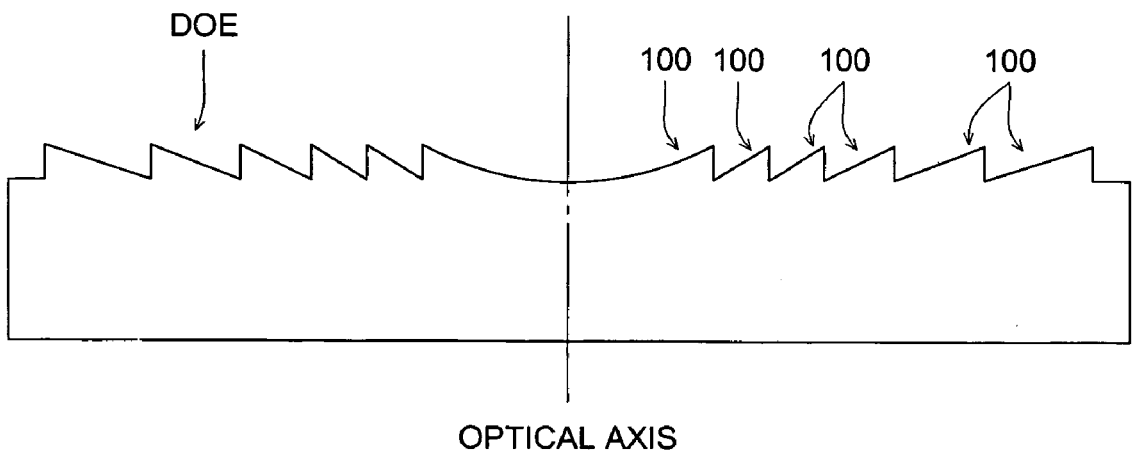
Figure 2:
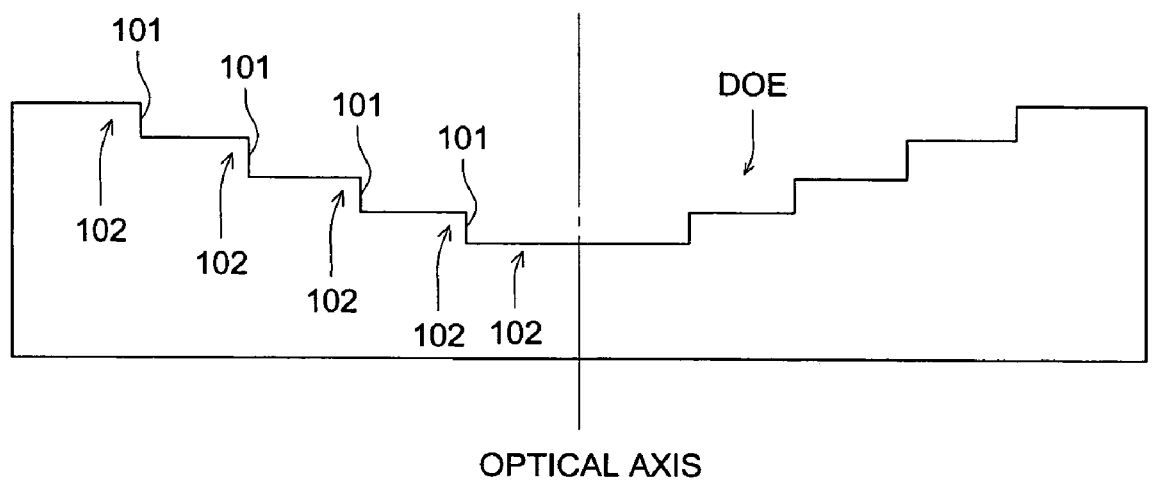
Figure 2:
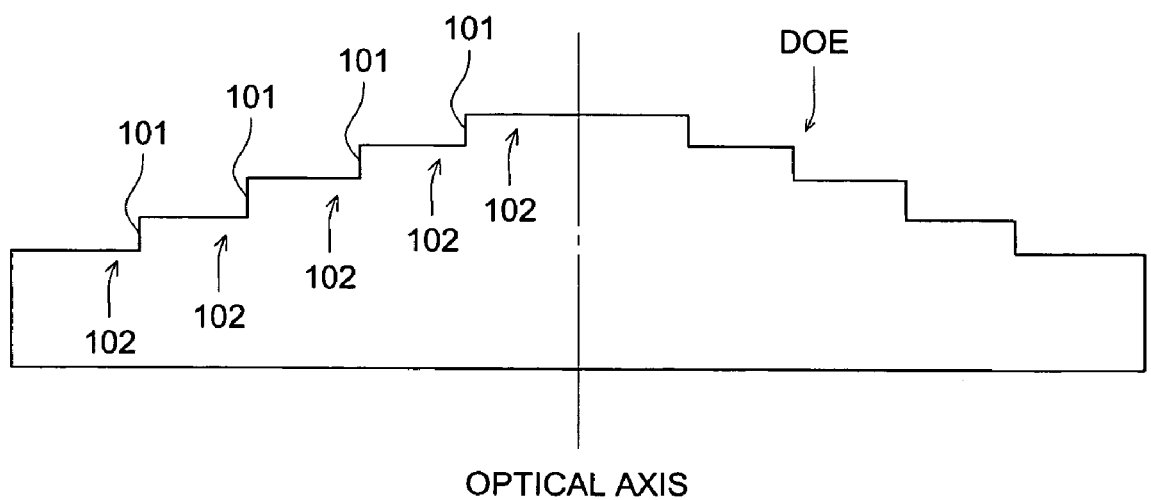
Figure 3:
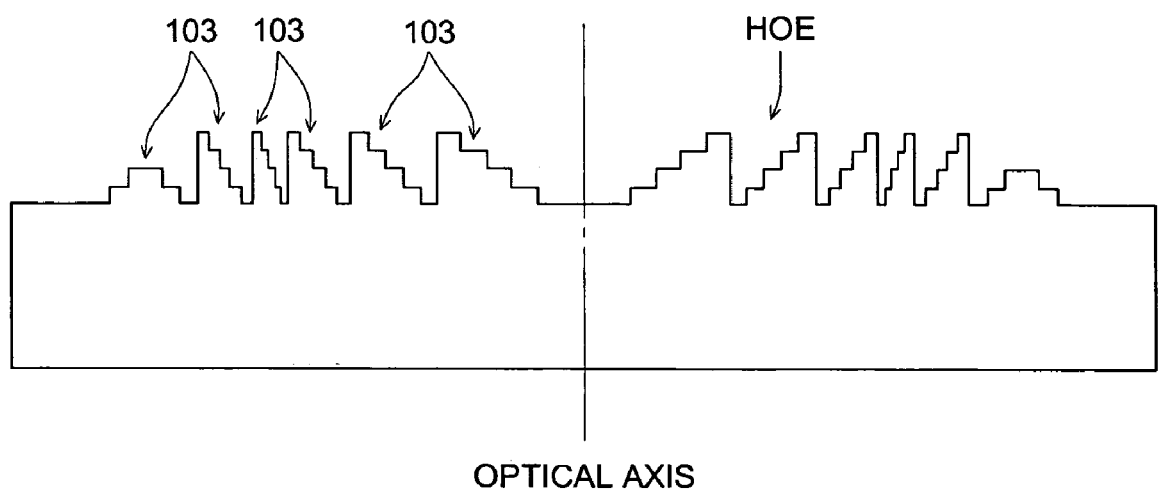
Figure 3:
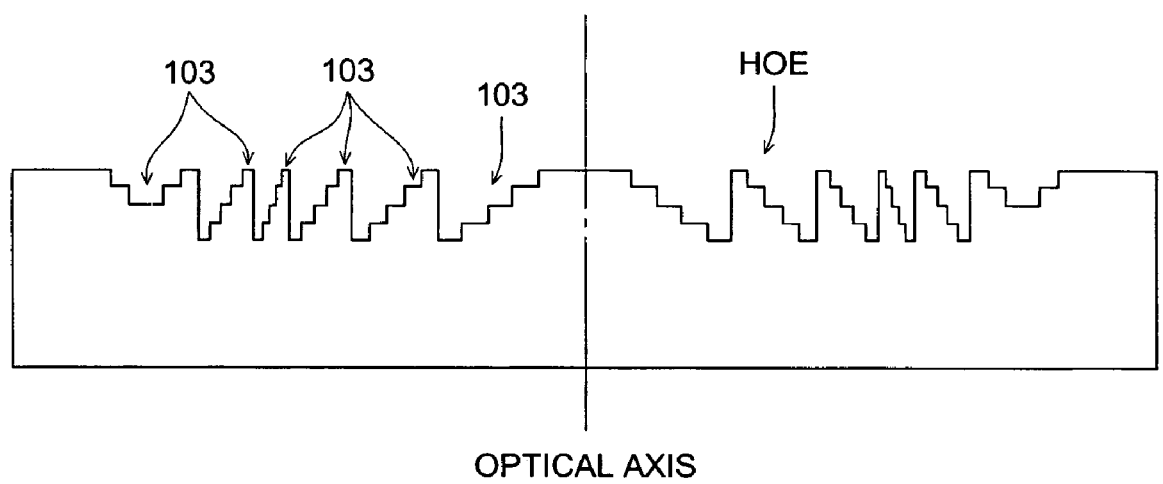

Each of FIGS. 3(*a*) and 3(*b*) is side view showing an example of a diffractive structure HOE.

Figure 4:
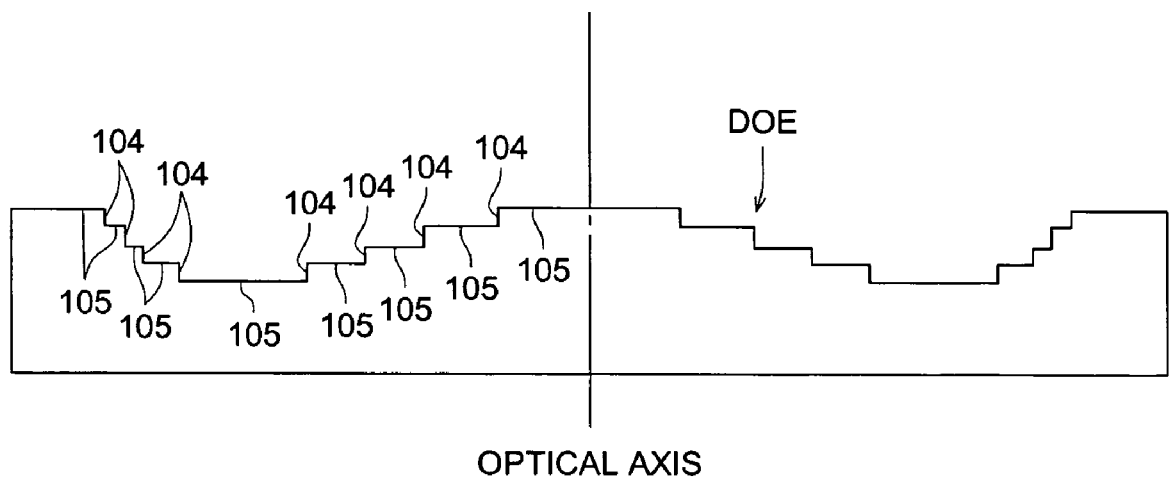
Figure 4:
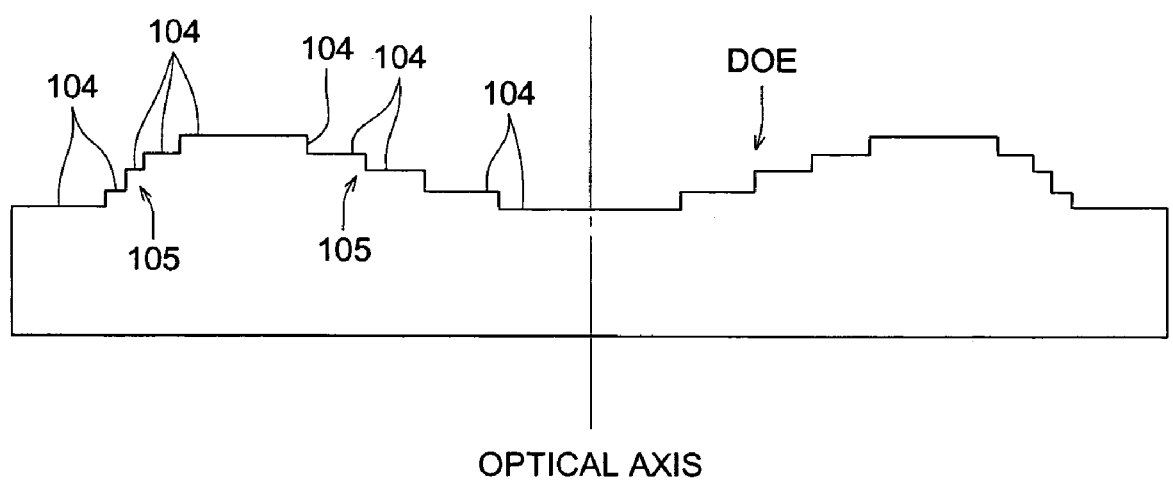

Each of FIGS. 4(*a*) and 4(*b*) is side view showing an example of a diffractive structure DOE.

Figure 5:
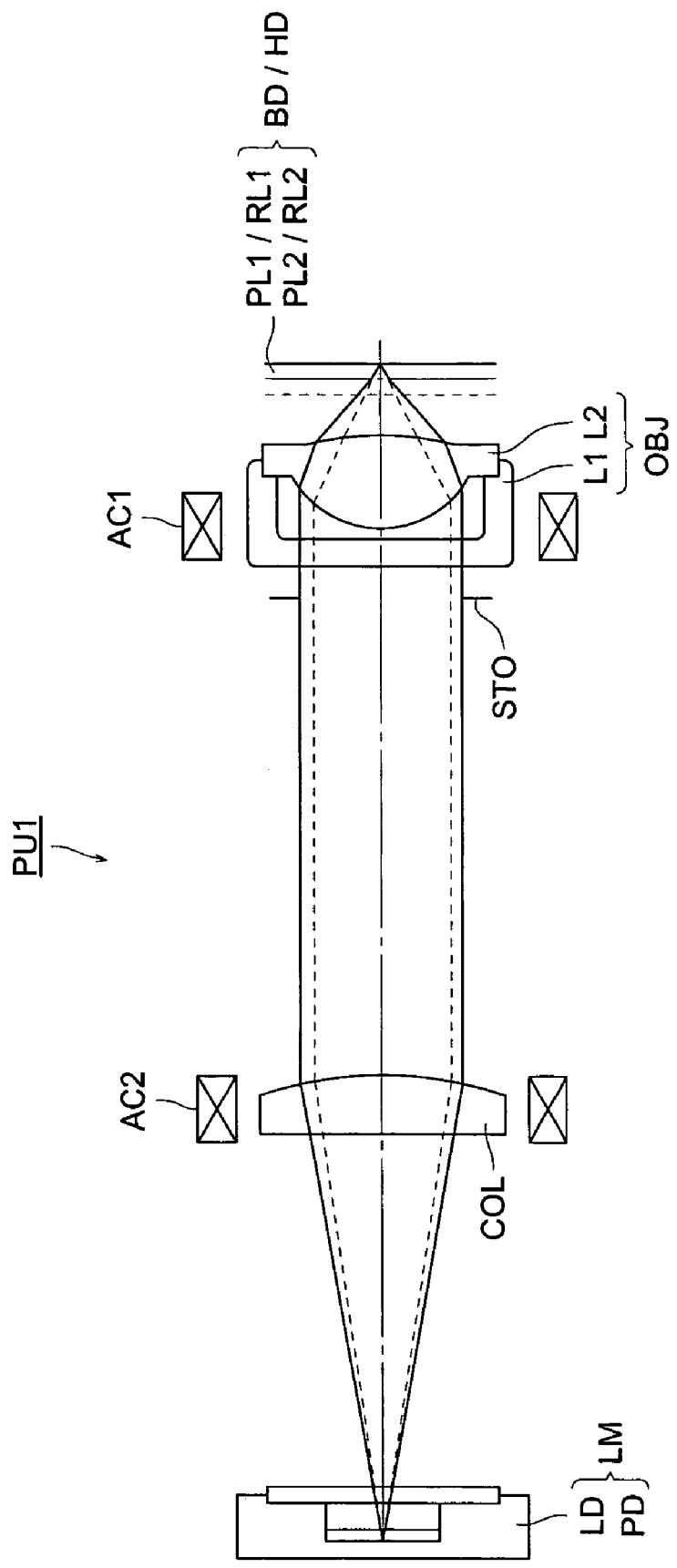

FIG. 5 is a plan view of a main part showing a structure of an optical pickup apparatus.

Figure 6:
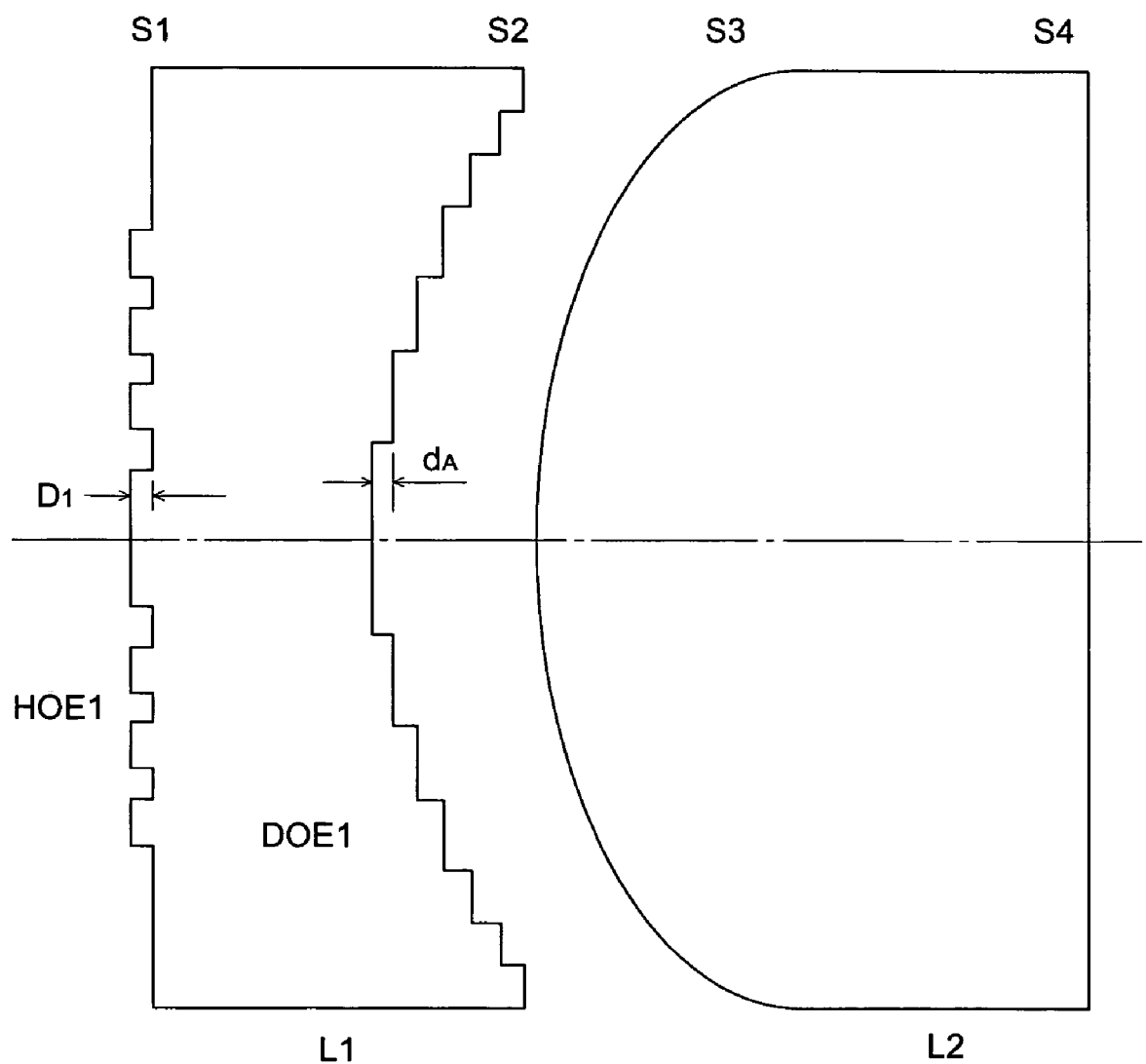

FIG. 6 is a plan view showing a structure of an objective lens (multi-focal objective lens).

Figure 7:
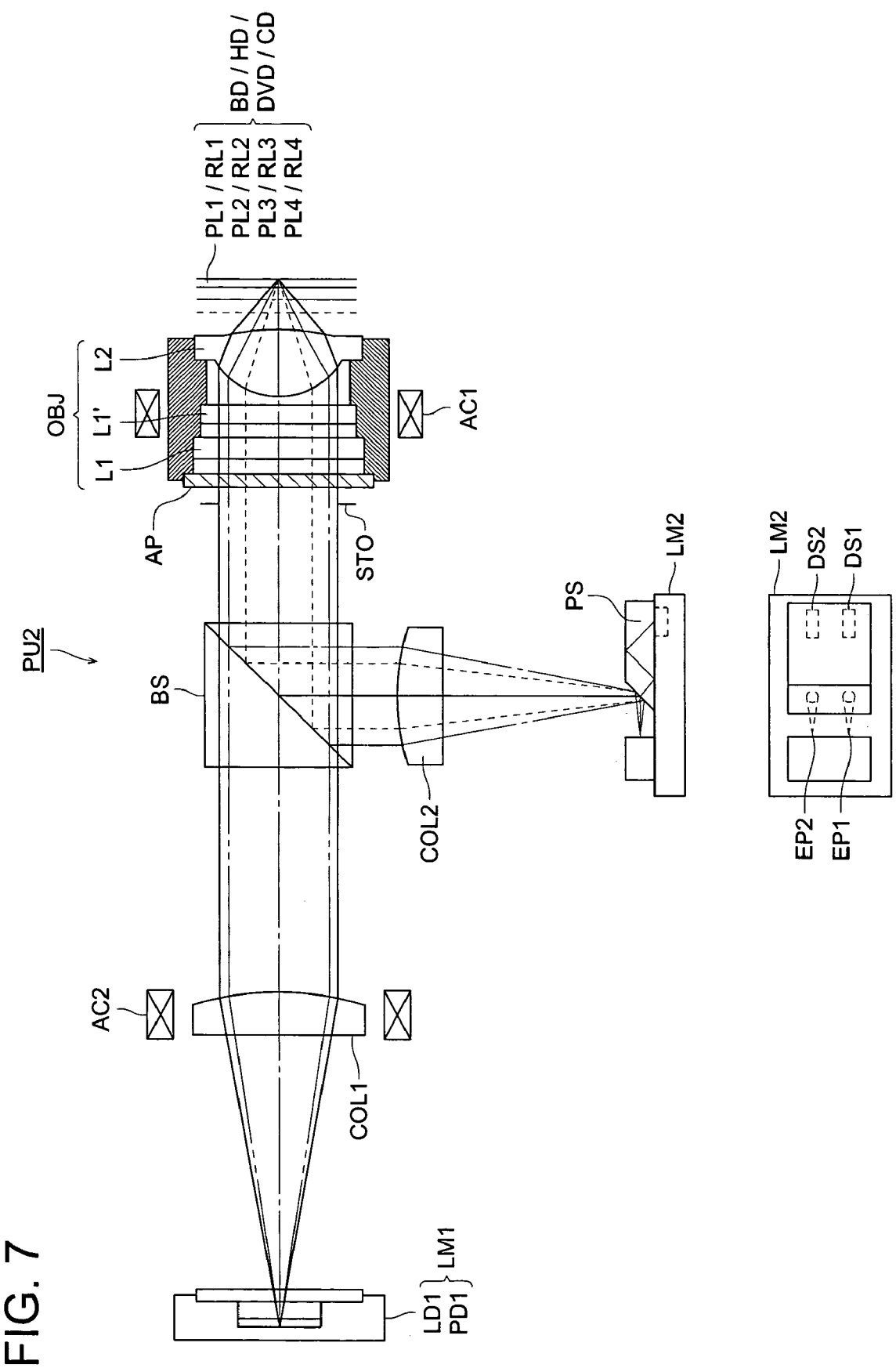

FIG. 7 is a plan view of a main part showing a structure of the optical pickup apparatus.

Figure 8:
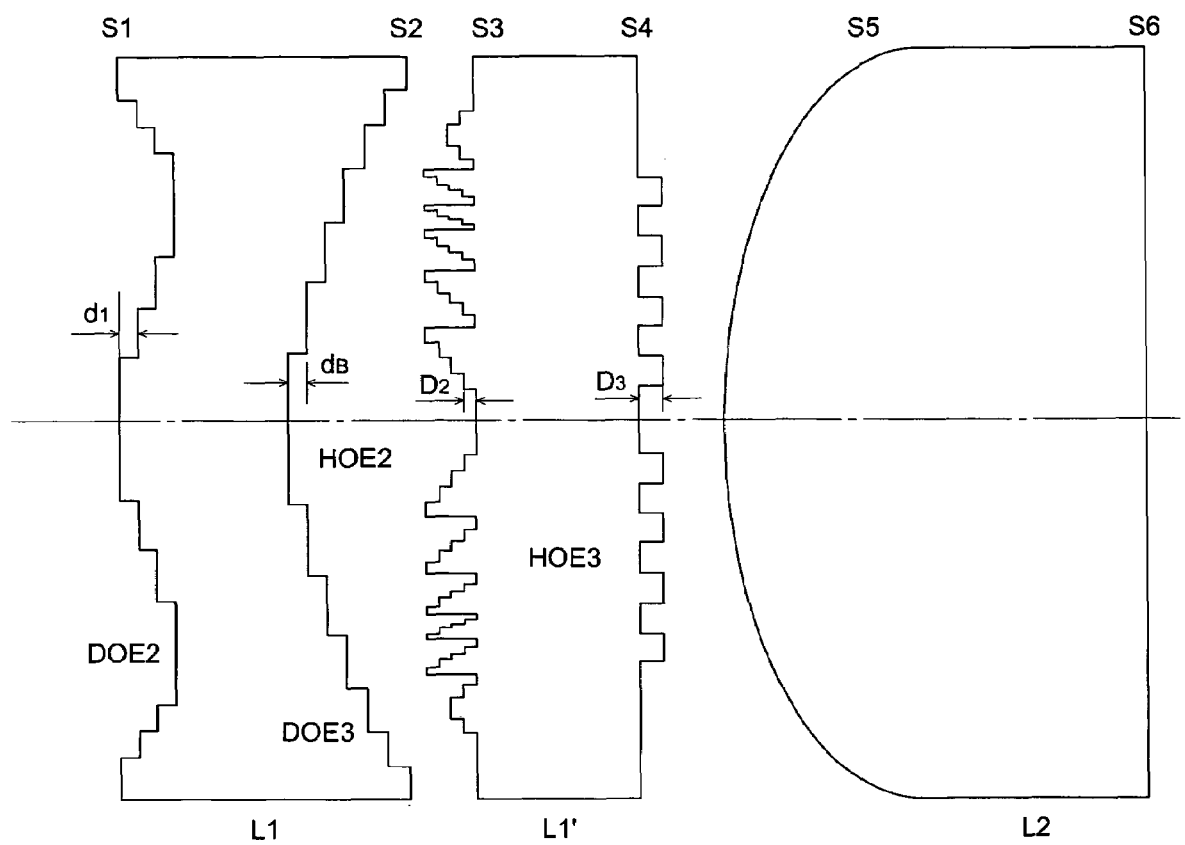

FIG. 8 is a plan view showing a structure of an objective lens (multi-focal objective lens).

DETAILED DESCRIPTION OF THE INVENTION

A preferable structure of the present invention will be described below.

Item 2

It is preferable that, in the multi-focal objective lens written in Item 1, when the multi-focal objective lens converges the m-th diffracted light flux on an information recording surface through the protective layer of the second optical disc, a wavefront of the converged m-th diffracted light flux has a spherical aberration $SA_m$, when the multi-focal objective lens converges the n-th diffracted light flux on an information recording surface through the protective layer of the second optical disc, a wavefront of the converged n-th diffracted light flux has a spherical aberration amount SAN, an absolute value of $SA_m$ or $SA_n$ is $0.07 \lambda_1$ RMS or less, and $SA_m$ and $SA_n$ satisfies $|SA_m - SA_n| \geq 0.9 \lambda_1$ RMS.

In the objective lens for BD with the wavelength 405 nm, NA 0.85 and protective layer thickness 0.1 mm, when the protective layer thickness is 0.6 mm corresponding to HD, the spherical aberration more than $0.9 \lambda$ RMS ($\lambda = 405$ nm) is generated within NA 0.65. Accordingly, as in the invention written in Item 1 and Item 2, the spherical aberration performance of the diffractive structure is determined so that almost of the light amount of the incident light flux of wavelength $\lambda_1$ is distributed to the m-th order diffracted light flux and the n-th order diffracted light flux, and the absolute value $|SA_m - SA_n|$ of the difference between the spherical aberration value $SA_m$ of the wave-front when the m-th order diffracted light flux is light converged through the protective layer of HD, and the spherical aberration value $SA_n$ of the wavefront when the n-th order diffracted light flux is light converged through the protective layer of HD, is larger than $0.9 \lambda_1$ RMS, and so that, in $SA_m$ and $SA_n$, the either one absolute value is smaller than $0.07 \lambda_1$ RMS. It allows the spherical aberration due to the difference of the protective layer thickness between BD and HD is corrected, and good wavefront can be formed on the information recording surface of each type of high density optical discs. In order to attain such an effect, it is more preferable that $|SA_m - SA_n|$ is larger than $1.0 \lambda_1$ RMS, and either one absolute value is smaller than $0.05 \lambda_1$ RMS. Further, in future, in order to correspond to a case where NA of HD is increased, it is preferable that $|SA_m - SA_n|$ is larger than $1.2 \lambda_1$ RMS.

Hereupon, a condition relating to the spherical aberrations of the above two focuses is the same meaning even when the expression is changed by a phrase of "when the multi-focal objective lens converges the m-th diffracted light flux on an information recording surface through the protective layer of the optical disc which has a thinner protective layer, a wavefront of the converged m-th diffracted light flux has a spherical aberration $SA_m$, when the multi-focal objective lens converges the n-th diffracted light flux on an information recording surface through the protective layer of the optical disc which has a thinner protective layer, a wavefront of the converged n-th diffracted light flux has a spherical aberration amount $SA_n$, an absolute value $|SA_m - SA_n|$ of the difference between $SA_m$ and $SA_n$ is larger than $4.4 \lambda_1$ RMS and an absolute value of $SA_m$ or $SA_n$ is $0.07 \lambda_1$ RMS or less".

Item 3

It is preferable that, in the multi-focal objective lens written in Item 1 or 2, when the first diffractive structure generates diffracted light fluxes from the first light flux entering into the first diffractive structure, diffracted light fluxes with a highest diffraction efficiency and a second highest diffraction efficiency among the diffracted light fluxes are the m-th diffracted light flux and the n-th light flux respectively.

Item 4

It is preferable that, in the multi-focal objective lens written in Item 3, a diffraction efficiency ηm of the m-th diffracted light flux and a diffraction efficiency ηn of the n-th diffracted light flux satisfy ηm>ηn.

Item 5

It is preferable that, in the multi-focal objective lens written in Item 3, a diffraction efficiency ηm of the m-th diffracted light flux and a diffraction efficiency ηn of the n-th diffracted light flux satisfy ηm=ηn.

Item 6

It is preferable that, in the multi-focal objective lens of Item 3, a diffraction efficiency ηm of the m-th diffracted light flux and a diffraction efficiency ηn of the n-th diffracted light flux satisfy ηm<ηn.

Item 7

It is preferable that, in the multi-focal objective lens written in any one of Items 1-6, a diffraction order m of the m-th diffracted light flux is integer and 1 or more, and the diffraction order m and a diffraction order n of the n-th diffracted light flux satisfy the following expression (1).

$$n=m-1 \quad (1)$$

Item 8

It is preferable that, in the multi-focal objective lens written in Item 7, a combination of the diffraction order m and the diffraction order n satisfies (m, n)=(1, 0), (2, 1), (3, 2).

As in Item 7, when the first diffractive structure is the structure structured by a plurality of ring-shaped zones divided by a minute step as typically shown in FIG. 1(a), FIG. 1(b), FIG. 2(a), FIG. 2(b), FIG. 4(a), FIG. 4(b), in order to obtain the high diffraction efficiency for both of m-th order diffracted light flux and n-th order diffracted light flux, it may be allowable when the difference between m and n is 1, and it is preferable that, as in Item 8, the combination of the diffraction order m and the diffraction order n is any one of (m, n)=(1, 0), (2, 1), (3, 2). In the combination of the diffraction order m and the diffraction order n to obtain the high diffraction efficiency for both of m-th order diffracted light flux and n-th order diffracted light flux, there are many number of combinations other than the above description. However, when the diffraction order m becomes too large, because the diffraction efficiency lowering when the incident light flux is changed becomes large, it is most preferable that the diffraction order m is not larger than 3.

Item 9

It is preferable that, in the multi-focal objective lens written in Item 8, a refractive index $N_1$ of the multi-focal objective lens for the wavelength $\lambda_1$ is in a range of 1.5 to 1.6, and the multi-focal objective lens satisfy one of following expressions (2) to (4):

$$0.27<d_1<0.48 \quad (2)$$

$$1.02<d_1<1.24 \quad (3)$$

$$1.72<d_1<2.02 \quad (4)$$

where $d_1$ is a depth (μm) of a step which is closest to an optical axis among the steps.

As in Item 9, when the combination of the diffraction order m and the diffraction order n is (m, n)=(1, 0), it is necessary that the design work is made so that the depth $d_1$ (μm) of the step closest to the optical axis satisfies the expression (2), when the combination of the diffraction order m and the diffraction order n is (m, n)=(2, 1), it is necessary that the design work is made so that the depth $d_1$ (μm) of the step closest to the optical axis satisfies the expression (3), and when the combination of the diffraction order m and the diffraction order n is (m, n)=(3, 2), it is necessary that the design work is made so that the depth $d_1$ (μm) of the step closest to the optical axis satisfies the expression (4). In other words, when the depth $d_1$ (μm) of the step closest to the optical axis is within the range of the expression (2), it can be judged that the $1^{st}$ order diffracted light flux and $0^{th}$ order diffracted light flux are used as the diffracted light flux for the information recording and/or reproducing on BD and HD, when the depth $d_1$ (μm) of the step closest to the optical axis is within the range of the expression (3), it can be judged that the $2^{nd}$ order diffracted light flux and $1^{st}$ order diffracted light flux are used as the diffracted light flux for the recording and/or reproducing of BD and HD, and when the depth $d_1$ (μm) of the step closest to the optical axis is within the range of the expression (4), it can be judged that the $3^{rd}$ order diffracted light flux and $2^{nd}$ order diffracted light flux are used as the diffracted light flux for the recording and/or reproducing of BD and HD, Item 10

It is preferable that, in the multi-focal objective lens written in any one of Items 3 to 5, a depth $d_1$ (μm) of a step which is closest to an optical axis among the steps, the wavelength $\lambda_1$ (μm), and a refractive index $N_1$ of the multi-focal objective lens for the wavelength $\lambda_1$ satisfy the following expression (5):

$$0.4 \leq |INT(X)-X| \leq 0.5 \quad (5)$$

where, $X=d_1 \cdot (N_1-1)/\lambda_1$, and
INT(X) is an integer value closest to X.

As in Item 10, when the depth $d_1$ (μm) of the step closest to the optical axis is within the range satisfying the expression (5), $d_1$ is set to the depth of almost (q−0.5) times of the wavelength $\lambda_1$. Herein, q is a natural number. Hereby, because almost of the light amount of the light flux of the wavelength $\lambda_1$ incident on the first diffractive structure is distributed to 2 diffracted light fluxes of m-th order diffracted light flux and n-th order diffracted light flux (hereupon, n=m−1), the light amount of the diffracted light flux for the recording and/or reproducing of BD and HD can be largely secured.

Item 11

It is preferable that, in the multi-focal objective lens written in Item 1, wherein each of the plurality of ring-shaped zones of the first diffractive structure includes a step structure, a diffraction order m of the m-th diffracted light flux is integer and 1 or more, and the diffraction order m and a diffraction order n of the n-th diffracted light flux satisfy the following expression (6).

$$n=-m \quad (6)$$

The multi-focal objective lens written in Item 11 may satisfy any one of combinations of m and n: (m, n)=(1, −1), (2, −2), (3, −3), where m is a diffraction order of the m-th diffracted light flux and n is a diffraction order of the n-th diffracted light flux.

As in Item 11, when the first diffractive structure is a structure structured by a plurality of ring-shaped zones having inside the step structure as typically shown in FIG. 3(a), FIG. 3(b), in order to obtain the high diffraction efficiency for both of m-th order diffracted light flux and n-th order diffracted light flux, absolute values of m and n are the same, and their signs may be reversed, and it is preferable that. Herein, the combination of the diffraction order m and the diffraction order n is any one of (m, n)=(1, −1), (2, −2), (3, −3). For a combination of the diffraction order m and diffraction order n to obtain the high diffraction efficiency for both of m-th order diffracted light flux and n-th order diffracted light flux, there are many numbers of combinations other than the above description, however, when the diffraction order m becomes too large, because the diffraction efficiency lowering when the incident light flux is changed, becomes large, it is most preferable that the diffraction order m is not larger than 3.

Item 12

It is preferable that, in the multi-focal objective lens written in Item 11, a step depth $D_1$ (μm) of the step structure of the first diffractive structure, the wavelength $\lambda_1$ (μm), and a refractive index $N_1$ of the multi-focal objective lens for the wavelength $\lambda_1$ satisfy the following expression (7):

$$D_1 \cdot (N1-1)/\lambda_1 = q1-0.5 \qquad (7)$$

where, q1 is a natural number.

Item 13

It is preferable that, in the multi-focal objective lens written in Item 12, when the step structure of each of the plurality of ring-shaped zones of the first diffractive structure is divided into steps, a number of the steps $M_1$ of the first diffractive structure is an even number.

As in Item 12, when the depth $D_1$ of the step structure is within the range satisfying the expression (7), the $D_1$ is set to the depth of almost (q−0.5) times of the wavelength $\lambda_1$. Herein, q1 is a natural number. Hereby, almost of the light amount of the light flux of wavelength $\lambda_1$ incident on the first diffractive structure is distributed to 2 diffracted light flux of m-th order diffracted light flux and the n-th order diffracted light flux (where, n=−m), however, as in Item 13, when the number of steps $M_1$ of each ring-shaped zone is even number, the light amount of the diffracted light flux for the recording and/or reproducing of BD and HD can be secured at largest.

Item 14

It is preferable that, in the multi-focal objective lens written in any one of Items 1 to 13, the multi-focal objective lens converges a diffracted light flux with a higher diffraction order of the m-th diffraction order and the n-th diffraction order on an information recording surface of the second optical disc, and converges a diffracted light flux with a lower diffraction order of the m-th diffraction order and the n-th diffraction order on an information recording surface of the first optical disc.

Item 15

It is preferable that, in the multi-focal objective lens written in Item 14 has a negative paraxial diffractive power of the first diffractive structure.

As in Items 14 and 15, the structure is designed in such a manner that, the multi-focal objective lens converges the diffracted light flux whose diffraction order is larger between the m-th order diffracted light flux and the n-th order diffracted light flux, on the information recording surface of the optical disc whose protective layer thickness is larger, for example, HD, and the multi-focal objective lens converges the diffracted light flux whose diffraction order is smaller, on the information recording surface of the optical disc whose protective layer thickness is smaller, for example, BD, and the paraxial diffraction power of the first diffractive structure is negative, a working distance of the multi-focal objective lens for HD whose protective layer thickness is larger than BD, can be sufficiently secured.

Item 16

A multi-focal objective lens is provided for use in an optical pickup apparatus for recording and/or reproducing information using a first light flux with a wavelength $\lambda_1$ ($\lambda_1 \leq 450$ nm) on a first optical disc with a protective layer with a thickness $t_1$ and a second optical disc with a protective layer with a thickness $t_2$ ($t_1 < t_2$) and for recording and/or reproducing information using a second light flux with a wavelength $\lambda_2$ (630 nm $< \lambda_2 \leq 680$ nm) on a third optical disc with a protective layer with a thickness $t_3$ which is a different kind from the first and second optical discs. The multi-focal objective lens includes: a first optical surface including a first diffractive structure and a second optical surface including a second diffractive structure. The first diffractive structure has a plurality of ring-shaped zones divided by steps and generates a m-th diffracted light flux and a n-th diffracted light flux (m≠n) from the first light flux entering into the first diffractive structure, and the second diffractive structure has a plurality of ring-shaped zones divided by steps and generates a v-th diffracted light flux from the second light flux entering into the second diffractive structure. The multi-focal objective lens converges a diffracted light flux with one of a m-th diffraction order and a n-th diffraction order on an information recording surface of the first optical disc for recording and/or reproducing information of the first optical disc, converges a diffracted light flux with another of the m-th diffraction order and the n-th diffraction order on an information recording surface of the second optical disc for recording and/or reproducing information of the second optical disc, and converges the v-th diffracted light flux on an information recording surface of the third optical disc for recording and/or reproducing information of the third optical disc.

Item 17

It is preferable that, in the multi-focal objective lens written in Item 16, when the first diffractive structure generates diffracted light fluxes from the first light flux entering into the first diffractive structure, diffracted light fluxes with a highest diffraction efficiency and a second highest diffraction efficiency among the diffracted light fluxes have the m-th diffracted light flux and the n-th light flux respectively.

Item 18

It is preferable that, in the multi-focal objective lens written in Item 16 or 17, a diffraction order m of the m-th diffracted light flux is integer and 1 or more, and the diffraction order m and a diffraction order n of the n-th diffracted light flux satisfy n=m−1.

Item 19

It is preferable that, in the multi-focal objective lens written in Item 16 or 17, a diffraction order m of the m-th diffracted light flux is integer and 1 or more, and the diffraction order m and a diffraction order n of the n-th diffracted light flux satisfy n=−m.

Item 20

It is preferable that, in the multi-focal objective lens written in any one of Items 16-19, the second optical surface having the second diffractive structure is a different surface from the first optical surface.

Item 21

It is preferable that, in the multi-focal objective lens written in Item 20, each of the plurality of ring-shaped zones of the second diffractive structure includes a step structure, the step structure does not provide a phase difference to the first light flux and provides a phase difference to the second light flux.

Item 22

It is preferable that, in the multi-focal objective lens written in Item 21, a step depth $D_2$ (μm) of the step structure of the second diffractive structure, the wavelength $\lambda_1$ (μm), and a refractive index $N_1$ of the multi-focal objective lens for the wavelength $\lambda_1$ satisfies the following expression (8):

$$D_2 \cdot (N_1-1)/\lambda_1 = 2 \cdot q2 \quad (8)$$

where, q2 is a natural number and a number of the steps $M_2$ of the step structure of the second diffractive structure is one of 4, 5 and 6.

Presently, because many DVDs are distributed in the market as image distribution media, the compatibility to DVD is also required for the high density optical disc player and/or recorder. According to Item 21, because the second diffractive structure formed on the optical surface different from the optical surface on which the first diffractive structure is formed, does not practically give the phase difference to the light flux of the wavelength $\lambda_1$, but gives the phase difference to the light flux of wavelength $\lambda_2$ ($\lambda_2 > \lambda_1$), the diffraction action can be given only to the light flux of wavelength $\lambda_2$ used for the optical disc (for example, DVD) other than the high density optical disc. Hereby, the spherical aberration due to the difference of the protective layer thickness between the high density optical disc and DVD or the spherical aberration due to the difference between using wavelengths can be corrected. Hereby, on the high density optical disc and DVD whose protective layer thickness, such as BD and HD, are different from each other, the recording and/or reproducing of the information can be compatibly conducted by using a common objective lens.

Specifically, as in Item 22, when the depth of step is within the range satisfying the expression (8), the depth $D_2$ of the step is set to the depth of about several times of the wavelength $\lambda_1$. When, on the step structure in which the depth of the step is set in this manner, the light flux of wavelength $\lambda_1$ is incident, the optical path difference of $2 \times q2 \times \lambda_1$ (μm) is generated between adjoining steps, and because the phase difference is not practically given to the light flux of wavelength $\lambda_1$, the incident light flux of wavelength $\lambda_1$ is not diffracted in the second diffractive structure, and is transmitted as it is.

On the one hand, the phase difference corresponding to the depth of the step and the number of divisions (the number of steps) is given to the light flux of wavelength $\lambda_2$, and the diffraction action is received, however, when the number of steps $M_2$ of each ring-shaped zone is set to any one of 4, 5, 6, the diffracted light flux of the wavelength $\lambda_2$ having the high diffraction efficiency can be obtained, and the recording and/or reproducing of the information can be conducted on DVD, by using this diffracted light flux.

Item 23

It is preferable that, in the multi-focal objective lens written in Item 20, when the second diffractive structure generates diffracted light fluxes from the first light flux entering into the second diffractive structure, a diffracted light flux with a highest diffraction efficiency among the diffracted light fluxes is a w-th diffracted light flux and diffraction orders of the w-th diffracted light flux and the v-th diffracted light flux satisfy w>v.

Item 24

It is preferable that, in the multi-focal objective lens written in Item 23, the diffraction orders of the w-th diffracted light flux and the v-th diffracted light flux satisfy w=2 and v=1.

Item 25

It is preferable that, in the multi-focal objective lens written in Item 23, the diffraction orders of the w-th diffracted light flux and the v-th diffracted light flux satisfy w=3 and v=2.

As in Item 23, when the second diffractive structure is designed so as to generate diffracted light fluxes from the first light flux entering into the second diffractive structure and a diffracted light flux with a highest diffraction efficiency among the diffracted light fluxes is a w-th diffracted light flux and diffraction orders of the w-th diffracted light flux, the diffraction efficiency of any one of w-th order diffracted light flux and v-th order diffracted light flux can be increased, and the spherical aberration due to the difference of the protective layer thickness between the high density optical disc and DVD or the spherical aberration due to the difference between using wavelengths can be corrected.

Hereupon, as in Items 24 and 25, a combination of the diffraction order w and diffraction order v, (w, v)=(2, 1), or (3, 2) is preferable. There are innumerable combinations of the diffraction order w and diffraction order v in order to obtain the high diffraction efficiency for both of the w-th order diffracted light flux and the v-th order diffracted light flux, other than the above description. However, when the diffraction order w is too large, because the diffraction efficiency lowering becomes large when the incident light flux is changed, it is most preferable that the diffraction order w is 3 or 2.

In the multi-focal objective lens, the second light flux may have the wavelength $\lambda_2$ within the range of 0.63 μm to 0.68 μm.

According to above structure, the recording and/or reproducing of the information can be compatibly conducted on the high density optical disc and DVD, whose protective layer thickness are different from each other, such as BD and HD, by using a common objective lens.

Item 26

An optical pickup apparatus is provided for recording and/or reproducing information on a first optical disc with a protective layer with a thickness $t_1$ and a second optical disc with a protective layer with a thickness $t_2$ ($t_1 < t_2$) The optical pickup apparatus includes: a light source for emitting a first light flux with a wavelength $\lambda_1$ ($\lambda_1 \leq 450$ nm) and for recording and/or reproducing information on the first and the second discs; a multi-focal objective lens having a first optical surface including a first diffractive structure which has a plurality of ring-shaped zones divided by steps and generates a m-th diffracted light flux and a n-th diffracted light flux(m≠n) from the first light flux entering into the first diffractive structure; and an actuator for actuating the multi-focal objective lens in two directions for tracking and focusing the multi-focal objective lens. The multi-focal objective lens converges a diffracted light flux with one of the m-th diffraction order and the n-th diffraction order on an information recording surface of the first optical disc for recording and/or reproducing information on the first optical disc, and converges a diffracted light flux with another of the m-th diffraction order and the n-th diffraction order on an information recording surface of the second optical disc for recording and/or reproducing information on the second optical disc.

Item 27

It is preferable that, in the optical pickup apparatus written in Item 26, when the multi-focal objective lens converges the m-th diffracted light flux on an information recording surface of the second optical disc, a wavefront of the converged m-th diffracted light flux has a spherical aberration $SA_m$, when the multi-focal objective lens converges the n-th diffracted light flux on an information recording surface of the second optical disc, a wavefront of the converged n-th diffracted light flux has a spherical aberration amount $SA_n$, and an absolute value of $SA_m$ or $SA_n$ is 0.07 $\lambda_1$ RMS or more, and $SA_m$ and $SA_n$ satisfies $$|SA_m - SA_n| \geq 0.9\, \lambda_1 \text{ RMS}.$$

Item 28

It is preferable that, in the optical pickup apparatus written in Item 26, when the first diffractive structure generates diffracted light fluxes from the first light flux entering into the first diffractive structure, diffracted light fluxes with a highest diffraction efficiency and a second highest diffraction efficiency among the diffracted light fluxes are the m-th diffracted light flux and the n-th light flux respectively.

Item 29

It is preferable that, in the optical pickup apparatus written in Item 26, a diffraction order m of the m-th diffracted light flux is integer and 1 or more, and the diffraction order m and a diffraction order n of the n-th diffracted light flux satisfy n=m−1.

Item 30

It is preferable that, in the optical pickup apparatus written in Item 29, a combination of the diffraction order m and the diffraction order n satisfies one of following:

(m, n)=(1, 0), (2, 1), (3, 2).

Item 31

It is preferable that, in the optical pickup apparatus written in Item 30, a refractive index $N_1$ of the multi-focal objective lens for the wavelength $\lambda_1$ is in a range of 1.5 to 1.6, and the multi-focal objective lens safeties one of following expressions:

$$0.27 < d_1 < 0.48$$

$$1.02 < d_1 < 1.24$$

$$1.72 < d_1 < 2.02$$

where $d_1$ is a depth (μm) of a step which is closest to an optical axis among the steps.

Item 32

It is preferable that, in the optical pickup apparatus written in Item 29, a depth $d_1$ (μm) of a step which is closest to an optical axis among the steps, the wavelength $\lambda_1$ (μm), and a refractive index $N_1$ of the multi-focal objective lens for the wavelength $\lambda_1$ satisfy $$0.4 \leq |INT(X) - X| \leq 0.5$$

where, $X = d_1 \cdot (N_1 - 1)/\lambda_1$, and

INT(X) is an integer value closest to X.

Item 33

It is preferable that, in the optical pickup apparatus written in Item 26, each of the plurality of ring-shaped zones of the first diffractive structure includes a step structure, a diffraction order m of the m-th diffracted light flux is integer and 1 or more, and the diffraction order m and a diffraction order n of the n-th diffracted light flux satisfy n=−m.

Item 34

It is preferable that, in the optical pickup apparatus written in Item 33, a step depth $D_1$ (μm) of the step structure of the first diffractive structure, the wavelength $\lambda_1$ (μm), and a refractive index $N_1$ of the multi-focal objective lens for the wavelength $\lambda_1$ satisfy $$D_1(N_1-1)/\lambda_1 = q1 - 0.5$$

where, q1 is a natural number.

Item 35

It is preferable that, in the optical pickup apparatus written in Item 34, when the step structure of each of the plurality of ring-shaped zones of the first diffractive structure is divided into steps, a number of the steps $M_1$ of the first diffractive structure is an even number.

Item 36

It is preferable that, in the optical pickup apparatus written in Item 34, the multi-focal objective lens converges a diffracted light flux with a higher diffraction order of the m-th diffraction order and the n-th diffraction order on an information recording surface of the second optical disc, and converges a diffracted light flux with a lower diffraction order of the m-th diffraction order and the n-th diffraction order on an information recording surface of the first optical disc.

Item 37

It is preferable that, the optical pickup apparatus written in any one of Items 26-36, further includes: a light source for emitting a first light flux with a wavelength $\lambda_1$ ($\lambda_1 \leq 450$ nm).

Item 38

It is preferable that, in the optical pickup apparatus written in any one of Items 26-37, the multi-focal objective lens includes a first area where a center-part light flux partially including the first and second light fluxes and including an optical axis passes through, a second area where an outer-part light flux which is outer part of the center-part light fluxes passes through, the multi-focal objective lens converges the first light flux passing through the first area and the second area onto an information recording surface of the first optical disc when recording and/or reproducing information on the first optical disc, converges the first light flux passing through the first area onto an information recording surface of the second optical disc when recording and/or reproducing information on the second optical disc, and makes the first light flux passing through the second area into a flare light which is not converged onto an information recording surface of the second optical disc when recording and/or reproducing information on the second optical disc.

Item 39

An optical pickup apparatus is provided for recording and/or reproducing information on a first optical disc having a protective layer with a thickness $t_1$, a second optical disc having a protective layer with a thickness $t_2$ ($t_1 < t_2$), and a third optical disc having a protective layer with a thickness $t_3$ which is a different kind from the first and second optical discs. The optical pickup apparatus includes: a first light source for emitting a first light flux with a wavelength $\lambda 1$ ($\lambda_1 \leq 450$ nm) and for recording and/or reproducing information on the first and the second discs; a second light source for emitting a second light flux with a wavelength $\lambda_2$ (630 nm $\leq \lambda_2 \leq$ 680 nm) for recording and/or reproducing information on the third disc; a multi-focal objective lens for converging each of the first and second light fluxes onto an information recording surface of a corresponding optical disc among the first to third optical discs; and an actuator for actuating the multi-focal objective lens in two directions for tracking and focusing the multi-focal objective lens. The multi-focal objective lens includes a first optical surface including a first diffractive structure which has a plurality of ring-shaped zones divided by steps and generates a m-th diffracted light flux and a n-th diffracted light flux (m≠n) from the first light flux entering into the first diffractive structure, and a second optical surface including a second diffractive structure which has a plurality of ring-shaped zones divided by steps and generates a v-th diffracted light flux from the second light flux entering into the second diffractive structure. The multi-focal objective lens converges a diffracted light flux with one of the m-th diffraction order and the n-th diffraction order on an information recording surface of the first optical disc for recording and/or reproducing information of the first optical disc, converges a diffracted light flux with another of the m-th diffraction order and the n-th diffraction order on an information recording surface of the second optical disc for recording and/or reproducing information of the second optical disc, and converges a v-th diffracted light flux on an information recording surface of the third optical disc for recording and/or reproducing information of the third optical disc.

Item 40

It is preferable that, in the optical pickup apparatus written in Item 39, when the first diffractive structure generates diffracted light fluxes from the first light flux entering into the first diffractive structure, diffracted light fluxes with a highest diffraction efficiency and a second highest diffraction efficiency among the diffracted light fluxes have the m-th diffracted light flux and the n-th light flux respectively.

Item 41

It is preferable that, in the optical pickup apparatus written in Item 39, a diffraction order m of the m-th diffracted light flux is integer and 1 or more, and the diffraction order m and a diffraction order n of the n-th diffracted light flux satisfy n=m−1.

Item 42

It is preferable that, in the optical pickup apparatus written in Item 39, the plurality of ring-shaped zones of the first diffractive structure includes a step structure, and the diffraction order m and a diffraction order n of the n-th diffracted light flux satisfy n=−m.

Item 43

It is preferable that, in the optical pickup apparatus written in any one of Items 39-42, the second optical surface having the second diffractive structure is a different surface from the first optical surface.

Item 44

It is preferable that, in the optical pickup apparatus written in any one of Items 39-43, each of the plurality of ring-shaped zones of the second diffractive structure includes a step structure, the step structure does not provide a phase difference to the first light flux and provides a phase difference to the second light flux.

Item 45

It is preferable that, in the optical pickup apparatus written in Item 44, wherein a step depth $D_2$ (μm) of the step structure of the second diffractive structure, the wavelength $\lambda_1$ (μm), and a refractive index $N_1$ of the multi-focal objective lens for the wavelength $\lambda_1$ satisfy $$D_2(N_1-1)/\lambda_1 = 2 \cdot q2$$

where, q2 is a natural number and a number of the steps $M_2$ of the second diffractive structure is one of 4, 5 and 6.

Item 46

It is preferable that, in the optical pickup apparatus written in any one of Items 39-45, when the second diffractive structure generates diffracted light fluxes from the first light flux entering into the second diffractive structure, a diffracted light flux with a highest diffraction efficiency among the diffracted light fluxes is a w-th diffracted light flux and diffraction orders of the w-th diffracted light flux and the v-th diffracted light flux satisfy w>v.

Item 47

It is preferable that, in the optical pickup apparatus written in Item 46, the diffraction orders of the w-th diffracted light flux and the v-th diffracted light flux satisfy w=2 and v=1.

Item 48

It is preferable that, in the optical pickup apparatus written in Item 46, the diffraction orders of the w-th diffracted light flux and the v-th diffracted light flux satisfy w=3 and v=2.

Item 49

It is preferable that, in the optical pickup apparatus written in any one of Items 39-50, the multi-focal objective lens includes a first area where a center-part light flux partially including the first and second light fluxes and including an optical axis passes through, a second area where an outer-part light flux which is outer part of the center-part light fluxes passes through. The multi-focal objective lens converges the first light flux passing through the first area and the second area onto an information recording surface of the first optical disc when recording and/or reproducing information on the first optical disc, the multi-focal objective lens converges the first light flux passing through the first area onto an information recording surface of the second optical disc, and makes the first light flux passing through the second area into a flare light which is not converged onto an information recording surface of the second optical disc when recording and/or reproducing information on the second optical disc. The multi-focal objective lens further converges the second light flux passing through the first area onto an information recording surface of the third optical disc, and makes the second light flux passing through the second area into a flare light which is not converged onto an information recording surface of the third optical disc when recording and/or reproducing information on the third optical disc.

Item 50

An optical pickup apparatus is provided for recording and/or reproducing information on a first optical disc having a protective layer with a thickness $t_1$, a second optical disc having a protective layer with a thickness $t_2$ ($t_1<t_2$), a third optical disc having a protective layer with a thickness $t_3$ and being different kind of an optical disc from the first and second optical discs, and a fourth optical disc having a protective layer with a thickness $t_4$ ($t_3<t_4$). The optical pickup apparatus includes: a first light source for emitting a first light flux with a wavelength $\lambda_1$ ($\lambda_1 \leq 450$ nm) and for recording and/or reproducing information on the first and the second discs; a second light source for emitting a second light flux with a wavelength $\lambda_2$ (630 nm$\leq \lambda_2 \leq$680 nm) for recording and/or reproducing information on the third disc; a third light source for emitting a third light flux with a wavelength $\lambda_2$ ($\lambda_2<\lambda_3$) for recording and/or reproducing information on the fourth disc, a multi-focal objective lens for converging each of the first and second light fluxes onto an information recording surface of a corresponding optical disc among the first—fourth optical discs; and an actuator for actuating the multi-focal objective lens in two directions for tracking and focusing the multi-focal objective lens. The multi-focal objective lens includes a first optical surface including a first diffractive structure which has a plurality of ring-shaped zones divided by steps and generates a m-th diffracted light flux and a n-th diffracted light flux (m≠n) from the first light flux entering into the first diffractive structure, and a second optical surface including a second diffractive structure which has a plurality of ring-shaped zones divided by steps and generates a v-th diffracted light flux from the second light flux entering into the second diffractive structure. The multi-focal objective lens converges a diffracted light flux with one of the m-th diffraction order and the n-th diffraction order on an information recording surface of the first optical disc for recording and/or reproducing information of the first optical disc. The multi-focal objective lens further converges a diffracted light flux with another of the m-th diffraction order and the n-th diffraction order on an information recording surface of the second optical disc for recording and/or reproducing information of the second optical disc. The multi-focal objective lens further converges a v-th diffracted light flux on an information recording surface of the third optical disc for recording and/or reproducing information of the third optical disc, and converges the third light flux on an information recording surface of the fourth optical disc for recording and/or reproducing information of the fourth optical disc after the third light flux emitted by the third light source enters into the multi-focal objective lens as a diverging light flux.

Item 51

It is preferable that, in the optical pickup apparatus written in Item 50, when the first diffractive structure generates diffracted light fluxes from the first light flux entering into the first diffractive structure, diffracted light fluxes with a highest diffraction efficiency and a second highest diffraction efficiency among the diffracted light fluxes have the m-th diffracted light flux and the n-th light flux respectively.

Item 52

It is preferable that, in the optical pickup apparatus written in Item 50 or 51, a diffraction order m of the m-th diffracted light flux is integer and 1 or more, and the diffraction order m and a diffraction order n of the n-th diffracted light flux satisfy n=m−1.

Item 53

It is preferable that, in the optical pickup apparatus written in Item 50 or 51, the plurality of ring-shaped zones of the first diffractive structure includes a step structure, and the diffraction order m and a diffraction order n of the n-th diffracted light flux satisfy n=−m.

Item 54

It is preferable that, in the optical pickup apparatus written in any one of Items 50-53, each of the plurality of ring-shaped zones of the second diffractive structure includes a step structure, the step structure does not provide a phase difference to the first light flux and provides a phase difference to the second light flux.

Item 55

It is preferable that, in the optical pickup apparatus written in any one of Items 50-54, when the second diffractive structure generates diffracted light fluxes from the first light flux entering into the second diffractive structure, a diffracted light flux with a highest diffraction efficiency among the diffracted light fluxes is a w-th diffracted light flux and diffraction orders of the w-th diffracted light flux and the v-th diffracted light flux satisfy w>v.

Item 56

It is preferable that, in the optical pickup apparatus written in any one of Items 50-55, the second light source and the third light source are arranged in one body by arranging so that the first light source and the second light source adjoin.

Item 57

It is preferable that, in the multi-focal objective lens written in Item 16, a thickness of a protective layer of the third optical disc is equal to a thickness of a protective layer of the second optical disc.

Item 58

It is preferable that, in the optical pickup apparatus of written in Items 39 or 50, a thickness of a protective layer of the third optical disc is equal to a thickness of a protective layer of the second optical disc.

Item 59

It is preferable that, in the multi-focal objective lens written in Item 16, is provided for use in an optical pickup apparatus for further recording and/or reproducing information on a fourth optical disc with a protective layer with a thickness $t_4$ ($t_2<t_4$) using a third light flux with a wavelength $\lambda_3$ ($\lambda_2<\lambda_3$). The multi-focal objective lens converges the third light flux on an information recording surface of the fourth optical disc for recording and/or reproducing information of the fourth optical disc after the third light flux emitted by the third light source enters into the multi-focal objective lens as a diverging light flux.

Item 60

The structure written in Item 60 provides an optical information recording and/or reproducing apparatus including an optical pickup apparatus of any one of Items 26, 39 and 50.

According to the present invention, the multi-focal objective lens by which focal points can be formed on the information recording surfaces of the high density optical discs in 2 kinds of standards whose protective layer thickness are different from each other, the optical pickup apparatus using it, and the optical information recording and/or reproducing apparatus can be provided.

EXAMPLES

First Embodiment

FIG. 5 is a view generally showing a structure of the first optical pickup apparatus PU1 by which the recording and/or reproducing of the information can be adequately conducted on any one of BD and HD. The optical specification of BD satisfies the followings: the wavelength $\lambda_1$ is 408 nm, thickness $t_1$ of the protective layer PL1 is 0.1 mm, numerical aperture $NA_1$ is 0.85. The optical specification of HD satisfies the followings: the wavelength $\lambda_1$ is 408 nm, thickness $t_2$ of the protective layer PL2 is 0.6 mm, numerical aperture $NA_2$ is 0.67. However, a combination of the wavelength, thickness of the protective layer, and numerical aperture is not limited to this.

The optical pickup apparatus PU1 is provided with a laser module LM for BD and HD, an objective lens OBJ (multi-focal objective lens) including an aberration correction element L1 and a light converging element L2, 2-axis actuator AC1, 1-axis actuator AC2, stop STO corresponding to the numerical aperture $NA_1$ of BD, and collimator lens COL. In the laser module LM for BD and HD, a blue-violet semiconductor laser LD for information recording and/or reproducing on BD and HD which emits a laser light flux with a wavelength of 408 nm, and a photo-detector PD are integrated with each other. The both surfaces of the light converging element L2 are aspheric surfaces and the light converging element L2 has a function by which the light flux passing through this aberration correction element L1 is converged on each of the information recording surfaces RL1 and RL2.

Hereupon, a blue-violet SHG laser can also be used other than the blue-violet semiconductor laser LD in the apparatus.

Next, a structure of the objective lens OBJ will be described. An outline structural view of the objective lens OBJ is shown in FIG. 6. The light converging element L2 is a plastic lens of exclusive use for BD and the light converging element L2 is optimized so that the spherical aberration is corrected for the wavelength $\lambda_1$ and the thickness $t_1$ of protective layer. Further, the diffractive structure HOE1 (the first diffractive structure) formed on the optical surface S1 on the laser module LM side of the aberration correction element L1 is a plastic lens and is a structure for correcting the spherical aberration due to the difference between the thickness $t_1$ of protective layer PL1 and the thickness $t_2$ of protective layer PL2. The diffractive structure DOE1 formed on the optical surface S2 on the optical disc side of the aberration correction element L1, is a structure for correcting the chromatic aberration of the objective lens OBJ in the blue-violet area. The aberration correction element L1 and light converging element L2 are integrated by being jointed mutual flanges formed in the peripheral portion of the elements.

The diffractive structure HOE1 is, as shown in FIG. 6, structured by a plurality of ring-shaped zones, and each ring-shaped zone has a step structure divided into 2 portions. The depth $D_1$ (μm) of the step formed in each ring-shaped zone of the diffractive structure HOE1 is designed so that a value in which q1=1 is substituted into the following expression (7)', is substantially satisfied. Herein, $N_1$ is a refractive index of the aberration correction element L1 to the wavelength $\lambda_1$.

$$D_1 = (q1 - 0.5) \cdot \lambda_1 / (N_1 - 1) \quad (7)'$$

When the light flux of wavelength $\lambda_1$ is incident on the step structure in which the depth $D_1$ of the step is set in this manner, because the optical path difference of $0.5 \times \lambda_1$ (μm) is given between adjoining step structures, almost portions of the light amount of the light flux of wavelength $\lambda_1$ are distributed to 2 diffracted light fluxes of $-1^{st}$ order diffracted light flux used for BD, and $1^{st}$ order diffracted light flux used for HD, however, when the division number $M_1$ (the number of the steps) of each ring-shaped zone of the diffractive structure HOE1 is an even number (in the present embodiment, 2), the light amount of the diffracted light flux for recording and/or reproducing of BD and HD can be secured at most.

Further, the width $\Lambda$ of each ring-shaped zone of the diffractive structure HOE1 is designed so that the diffracted light flux whose diffraction order is larger ($1^{st}$ order diffracted light flux) is converged on the information recording surface of HD, and the diffracted light flux whose diffraction order is smaller ($-1^{st}$ order diffracted light flux) is converged on the information recording surface of BD, and the paraxial diffraction power is negative. Hereby, the working distance to HD whose protective layer thickness is large, can be sufficiently secured.

Hereupon, because the diffractive structure HOE1 is formed only in the numerical aperture $NA_2$ of HD, it is structured in such a manner that the light flux passing an area outside of $NA_2$ becomes a flare light component on the information recording surface RL2 of HD, and the aperture to HD is automatically limited.

Further, the diffraction efficiency of $1^{st}$ order diffracted light flux of the light flux of wavelength $\lambda_1$ generated in the diffractive structure HOE1 is 40.5%, and the diffraction efficiency of $-1^{st}$ order diffracted light flux of the light flux of wavelength $\lambda_1$ is 40.5%.

Furthers the diffractive structure DOE1 is, as shown in FIG. 6, a structure structured by a plurality of ring-shaped zones whose sectional shape including the optical axis is step shape. In the diffractive structure DOE1, the depth $d_A$ (μm) of the step closest to the optical axis is designed so that it practically satisfies the following expression (9). Herein, $N_1$ is a refractive index of the aberration correction element L1 to the wavelength $\lambda_1$.

$$d_A = 1(N_1 - 1)/\lambda_1 \quad (9)$$

Because a technology by which the chromatic aberration of the objective lens OBJ in the blue-violet area is corrected by such a diffractive structure DOE1, is a publicly known technology, herein, the detailed description is omitted.

Hereupon, the diffraction efficiency of $1^{st}$ order diffracted light flux generated in the diffractive structure DOE1 is 100%.

Further, a collimator lens COL in the present embodiment is structured in such a manner that its position is shiftable in the optical axis direction by a 1-axis actuator AC2. Hereby, because the spherical aberration of a spot formed on the information recording surface of HD and BD can be corrected, a good recording and/or reproducing characteristic for HD and BD can be maintained usually.

Causes of generation of spherical aberration corrected by position adjustment of the collimator lens COL are, for example, a wavelength dispersion due to a production error of the blue-violet semiconductor laser LD, refractive index change or refractive index distribution of the objective lens OBJ following the temperature change, focus jump between layers at the time of recording and/or reproducing on the multi-layer disc such as 2-layer disc and 4-layer disc, and thickness dispersion or thickness distribution due to production error of the protective layer PL1.

When the optical pickup apparatus PU1 records and/or reproduces information on BD, as its light ray path is drawn by a solid line in FIG. 5, the blue-violet semiconductor laser LD initially emits a light flux. The collimator lens COL makes the diverging light flux emitted from the blue-violet semiconductor laser LD into a parallel light flux, and the stop STO regulates the light flux diameter. The objective lens OBJ provides light-converging action to the regulated light flux, and makes the light flux into a spot on the information recording surface RL1 through the protective layer PL1 of BD.

The objective lens OBJ conducts the focusing or tracking by 2-axis actuator AC1 arranged in its periphery. An information pit on the information recording surface RL1 modulates the reflected light flux on the information recording surface and the objective lens OBJ and the collimator lens COL make the modulated light flux into the convergence light flux again, and make the light flux converge on the light receiving surface of the photo-detector PD. Then, by using the output signal of the photo-detector PD, the information recorded in BD can be read.

When the optical pickup apparatus PU1 records and/or reproduces information on HD, as its light ray path is drawn by a dotted line in FIG. 5, the blue-violet semiconductor laser LD initially emits a light flux. The collimator lens COL makes the diverging light flux emitted by the blue-violet semiconductor laser LD into a parallel light flux. The objective lens OBJ provides the light-converging action to the parallel light flux and makes the light flux into a spot on the information recording surface RL2 through the protective layer PL2 of HD. Herein, because the diffractive structure HOE1 is formed only in the numerical aperture $NA_2$ of HD, the aperture limitation to HD is automatically conducted.

The objective lens OBJ conducts the focusing or tracking by 2-axis actuator AC1 arranged in its periphery. An information pit on the information recording surface RL2 modulates the light flux reflected on the information recording surface RL2 and the objective lens OBJ and the collimator lens COL transmit the light flux again, makes the modulated reflection light flux into the convergence light flux, and converge the light flux the light receiving surface of the photodetector PD. Then, by using the output signal of the photodetector PD, the information recorded in HD can be read.

In this embodiment, the optical pickup apparatus PU1 is provided with a blue-violet semiconductor laser LD for information recording and/or reproducing of on BD and HD, emitting a laser light flux of a wavelength 408 nm. However, the optical pickup apparatus may further includes another blue-violet semiconductor laser LD emitting a laser light flux of 408 nm. In this case, one of two blue-violet semiconductor laser is used for information recording and/or reproducing on BD and another is used for information recording and/or reproducing on HD.

Second Embodiment

FIG. 7 is a view generally showing a structure of the optical pickup apparatus PU2 by which the recording and/or reproducing of the information can be adequately conducted on any one of Bb, HD, DVD and CD. The optical specification of BD satisfies the followings: the wavelength $\lambda_1$ is 408 nm, thickness $t_1$ of the protective layer PL1 is 0.1 mm, numerical aperture $NA_1$ is 0.85. The optical specification of HD satisfies the followings: the wavelength $\lambda_1$ is 408 nm, thickness $t_2$ of the protective layer PL2 is 0.6 mm, numerical aperture $NA_2$ is 0.65. The optical specification of DVD satisfies the followings: the wavelength $\lambda_2$ is 658 nm, thickness $t_3$ of the protective layer PL3 is 0.6 mm, numerical aperture $NA_3$ is 0.65. The optical specification of CD satisfies the followings: the wavelength $\lambda_3$ is 785 nm, thickness $t_4$ of the protective layer PL4 is 1.2 mm, numerical aperture $NA_4$ is 0.45. However, a combination of the wavelength, thickness of the protective layer, and numerical aperture is not limited to this.

The optical pickup apparatus PU2 is provided with: a laser module LM1 for BD and HD; a laser module LM2 for DVD and CD; an objective lens OBJ; the first aberration correction element L1 and the second aberration correction element L1', a light-converging element L2; an aperture limit element AP for CD; a 2-axis actuator AC1; a stop STO corresponding to the numerical aperture NA1 of BD; a 1-axis actuator AC2; a polarizing beam splitter BS; the first collimator lens COLL; and the second collimator lens COL2.

In the laser module LM1 for BD and HD, a blue-violet semiconductor laser LD for information recording and/or reproducing on BD and HD which emits a laser light flux with a wavelength of 408 nm, and a photo-detector PD1 are integrated with each other. The laser module LM2 for DVD and CD includes the first light emitting point EP1 for information recording and/or reproducing on DVD which emits the laser light flux of a wavelength of 658 nm, the second light emitting point EP2 for information recording and/or reproducing of the information on CD which emits the light flux of a wavelength of 785 nm, the first light receiving section DS1 which receives the reflected light flux no the information recording surface RL3 of DVD, the second light receiving section DS2 which receives the reflected light flux on the information recording surface RL4 of CD, and a prism PS. The both surfaces of the light converging element L2 are aspheric surfaces and the light converging element L2 has a function to converge the laser light flux transmitted these first aberration correction element L1 and the second aberration correction element L1' on each of the information recording surfaces RL1, RL2, RL3, and RL4.

Hereupon, a blue-violet SHG laser can also be used other than the blue-violet semiconductor laser LD1.

Next, a structure of the objective lens OBJ will be described. An outline structural view is shown in FIG. 8. The light converging element L2 is a glass lens of exclusive use for BD and the light converging element L2 is optimized so that the spherical aberration is corrected for the wavelength $\lambda_1$ and the thickness $t_1$ of protective layer. Further, the diffractive structure DOE2 (the first diffractive structure) formed on the optical surface S1 (the first optical surface) on the laser module LM1 side of the aberration correction element L1 is a plastic lens, and is a structure for correcting the spherical aberration due to the difference between the thickness $t_1$ of protective layer PL1 and the thickness $t_2$ of protective layer PL2. The diffractive structure DOE3 formed on the optical surface S2 on the optical disc side of the aberration correction element L1, is a structure for correcting the chromatic aberration of the objective lens OBJ in the blue-violet area. The diffractive structure HOE2 (the second diffractive structure) formed on the optical surface S3 on the laser module LM1 side of the second aberration correction element L1' is a plastic lens, and is a structure for correcting the spherical aberration due to the difference between the thickness $t_1$ of the protective layer PL1 and the thickness $t_3$ of the protective layer PL3. The diffractive structure HOE3 formed on the optical surface S4 on the optical disc side of the second aberration correction element L1' is a structure for correcting the spherical aberration due to the difference between the thickness $t_1$ of the protective layer PL1 and the thickness $t_4$ of the protective layer PL4. The first aberration correction element L1, second aberration correction element L1', light converging element L2 and numerical aperture limit element AP are integrated by a joint member B arranged on their side surfaces.

Further, the diffractive structure DOE2 is, as shown in FIG. 8, structured by a plurality of ring-shaped zones whose sectional shape including the optical axis is step shape. In the diffractive structure DOE2, the depth $d_1$ (μm) of the step closest to the optical axis is designed so that it substantially satisfies the following expression (10). Herein, $N_1$ is a refractive index of the aberration correction element L1 to the wavelength $\lambda_1$.

$$d_1 = 1.5(N_1 - 1)/\lambda 1 \qquad (10)$$

Hereby, the diffractive structure DOE2 satisfies the above expressions (3) and (5), and almost portions of the light amount of the light flux of the wavelength $\lambda_1$ entering into the diffractive structure DOE2 are distributed to 2 diffracted light fluxes of the $2^{nd}$ order diffracted light flux and the $1^{st}$ order diffracted light flux.

Further, the width Λ of each ring-shaped zone of the diffractive structure HOE2 is designed so that the diffracted light flux whose diffraction order is larger, ($2^{nd}$ order diffracted light flux) is converged on the information recording surface of HD, and the diffracted light flux whose diffraction order is smaller, ($1^{st}$ order diffracted light flux) is converged on the information recording surface of BD, and the paraxial diffraction power is negative. Hereby, the working distance to HD whose protective layer thickness is larger, can be sufficiently secured.

Hereupon, because the diffractive structure DOE2 is formed only in the numerical aperture $NA_2$ of HD, it is structured in such a manner that the light flux passing an area outside of $NA_2$ becomes a flare component on the information recording surface RL2 of HD, and the aperture HD is automatically limited.

Further, when the light flux of wavelength $\lambda_2$ enters in the diffractive structure DOE2, the diffractive structure DOE2 generates $1^{st}$ order diffracted light flux so as to have the maximum diffraction efficiency, and when the light flux of wavelength $\lambda_3$ enters in the diffractive structure DOE2, the diffractive structure DOE2 generates $1^{st}$ order diffracted light flux so as to have the maximum diffraction efficiency.

Hereupon, the diffraction efficiency of $2^{nd}$ order diffracted light flux of the light flux of wavelength $\lambda_1$ generated in the diffractive structure DOE2 is 40.5%, the diffraction efficiency of $1^{st}$ order diffracted light flux of the light flux of wavelength $\lambda_2$ is 96.4%, and the diffraction efficiency of $1^{st}$ order diffracted light flux of the light flux of wavelength $\lambda_3$ is 80.3%

Further, the diffractive structure DOE3 is, as shown in FIG. 8, a structure structured by a plurality of ring-shaped zones whose sectional shape including the optical axis is step shape. In the diffractive structure DOE3, the depth $d_B$ (μm) of the step closest to the optical axis is designed so that it substantially satisfies the following expression (11). Herein, $N_1$ is a refractive index of the aberration correction element L1 to the wavelength $\lambda_1$.

$$d_B = 2 \cdot (N_1 - 1)/\lambda_1 \quad (11)$$

Because a technology by which the chromatic aberration of the objective lens OBJ in the blue-violet area is corrected by such a diffractive structure DOE3, is a publicly known technology, herein, the detailed description is omitted.

Further, when the light flux of wavelength $\lambda_1$ enters in the diffractive structure DOE3, the diffractive structure DOE3 generates $2^{nd}$ order diffracted light flux so as to have the maximum diffraction efficiency, when the light flux of wavelength $\lambda_2$ enters in the diffractive structure DOE3, the diffractive structure DOE3 generates $1^{st}$ order diffracted light flux so as to have the maximum diffraction efficiency, and when the light flux of wavelength $\lambda_3$ enters into the diffractive structure DOE3, the diffractive structure DOE3 generates $1^{st}$ order diffracted light flux so as to have the maximum diffraction efficiency.

Hereupon, the diffraction efficiency of $2^{nd}$ order diffracted light flux of the light flux of wavelength $\lambda_1$ generated in the diffractive structure DOE3 is 100%, the diffraction efficiency of $1^{st}$ order diffracted light flux of the light flux of wavelength $\lambda_2$ is 88.2%, and the diffraction efficiency of $1^{st}$ order diffracted light flux of the light flux of wavelength $\lambda_3$ is 100%.

The diffractive structure HOE2 is, as shown in FIG. 8, structured by a plurality of ring-shaped zones, and each ring-shaped zone is divided into 5 portions stepwise. The depth $D_2$ (μm) of the step formed in each ring-shaped zone of the diffractive structure HOE2 is designed so that a value in which q2=2 is substituted into the following expression (8)', is substantially satisfied. Herein, $N_1$ is a refractive index of the second aberration correction element L1' to the wavelength $\lambda_1$.

$$D_2 = q2 \cdot \lambda_1/(N_1 - 1) \quad (8)'$$

Because the optical path difference added to the light flux of wavelength $\lambda_1$ by this step structure is $2 \times \lambda_1$ (μm), the diffractive structure HOE2 does not provides any action to the light flux of wavelength $\lambda_1$, and transmits the light flux as it is ($0^{th}$ order diffracted light flux). Further, because the optical path difference added to the light flux of wavelength $\lambda_3$ by this step structure, is $1 \times \lambda_3$ (μm), the step structure also does not provide any action to the light flux of wavelength $\lambda_3$, and transmits the light flux as it is ($0^{th}$ order diffracted light flux). On the one hand, this step structure adds the optical path difference $0.2 \times \lambda_2$ (μm) to the light flux of wavelength $\lambda_2$.

Therefore, one portion of ring-shaped zone which is divided into 5 steps adds the optical path difference of just $1 \times \lambda_2$ to the light flux to the light flux, and generates $1^{st}$ order diffracted light flux. In this manner, when only the light flux of wavelength $\lambda_2$ is selectively diffracted, the spherical aberration due to the difference between the thickness $t_1$ of the protective layer PL1 and the thickness $t_3$ of the protective layer PL3 is corrected. Hereupon, because the diffractive structure HOE2 is formed only in the numerical aperture $NA_3$ of DVD, it is structured in such a manner that the light flux passing an area outside of $NA_3$ becomes a flare light component on the information recording surface RL3 of DVD, and the aperture to DVD is automatically limited.

Further, the diffraction efficiency of $0^{th}$ order diffracted light flux of the light flux of wavelength $\lambda_1$ generated in the diffractive structure HOE2 is 100%, the diffraction efficiency of $1^{st}$ order diffracted light flux of the light flux of wavelength $\lambda_2$ is 87.3%, and the diffraction efficiency of $0^{th}$ order diffracted light flux of the light flux of wavelength $\lambda_3$ is 100%.

The diffractive structure HOE3 is, as shown in FIG. 8, structured by a plurality of ring-shaped zones, and each ring-shaped zone has a step structure divided into 2 portions. The depth $D_3$ (μm) of the step formed in each ring-shaped zone of the diffractive structure HOE3 is designed so that a value in which q=5 is substituted into the following expression (12), is substantially satisfied. Herein, $N_1$ is a refractive index of the second aberration correction element L1' to the wavelength $\lambda_1$.

$$D_3 = q \cdot \lambda_1/(N_1 - 1) \quad (12)$$

Because this step structure adds the optical path difference $5 \times \lambda_1$ to the light flux of wavelength $\lambda_1$, the diffractive structure HOE3 does not provide any action to the light flux of wavelength $\lambda_1$, and transmits the light flux as it is ($0^{th}$ order diffracted light flux). Further, because this step structure adds the optical path difference $3 \times \lambda_2$ to the light flux of wavelength $\lambda_2$, this diffractive structure HOE3 also does not provide any action to the light flux of wavelength $\lambda_2$, and transmits the light flux as it is ($0^{th}$ order diffracted light flux). On the one hand, this step structure adds the optical path difference $0.5 \times \lambda_3$ to the light flux of wavelength $\lambda_3$. Therefore, one portion of ring-shaped zone which is divided into 2 steps adds the optical path difference of just a half wavelength, and almost parts of light amount of the light flux of wavelength $\lambda_3$ are distributed to $1^{st}$ order diffracted light flux and $-1^{st}$ order diffracted light flux. The width $\Lambda$ of each ring-shaped zone of the diffractive structure HOE3 is designed so that the $1^{st}$ order diffracted light flux is converged on the information recording surface RL4 of CD, and by this diffraction action, the spherical aberration due to the difference between the thickness $t_1$ of the protective layer PL1 and the thickness $t_3$ of the protective layer PL3 is corrected.

Hereupon, the diffraction efficiency of $0^{th}$ order diffracted light flux of the light flux of wavelength $\lambda_1$ generated in the diffractive structure HOE3 is 100%, the diffraction efficiency of $0^{th}$ order diffracted light flux of the light flux of wavelength $\lambda_2$ is 100%, and the diffraction efficiency of $1^{st}$ order diffracted light flux of the light flux of wavelength $\lambda_3$ is 40.4%.

Further, the first collimator lens COLL of the present embodiment is structured so that its position can be shifted in the optical axis direction by 1-axis actuator AC2. Hereby, because the spherical aberration of a spot formed on the information recording surface of HD and BD can be corrected, good recording and/or reproducing characteristic can be kept always for HD and BD.

Causes of generation of the spherical aberration corrected by the position adjustment of the first collimator lens COLL are, for example, a wavelength dispersion due to a production error of the blue-violet semiconductor laser LD, refractive index change or refractive index distribution of the objective lens OBJ following the temperature change, focus jump between layers at the time of recording and/or reproducing on the multi-layer disc such as 2-layer disc, 4-layer disc, and thickness dispersion or thickness distribution due to production error of the protective layer PL1.

When the optical pickup apparatus PU2 records and/or reproduces information on BD, as its light ray path is drawn by a solid line in FIG. 7, the blue-violet semiconductor laser LD initially emits a light flux. The first collimator lens COL1 makes the diverging light flux emitted by the blue-violet semiconductor laser LD1 into a parallel light flux, the polarizing beam splitter BS transmits the parallel light flux and then, the stop STO regulates the light flux diameter. The numerical aperture limit element AP transmits the light flux, and the objective lens OBJ provides light-converging action to the light flux and makes the light flux into a spot formed on the information recording surface RL1 through the protective layer PL1 of BD.

The objective lens OBJ conducts the focusing or tracking by 2-axis actuator AC1 arranged in its periphery. An information pit on the information recording surface RL1 modulates the reflected light flux on the information recording surface RL1. The objective lens OBJ, the numerical aperture limit element AP, the polarizing beam splitter BS, and the first collimator lens COL1 transmit the modulated light flux again, make the light flux into the convergence light flux, and converges the light flux on the light receiving surface of the photo-detector PD1. Then, by using the output signal of the photo-detector PD1, the information recorded in BD can be read.

When the optical pickup apparatus PU2 records and/or reproduces information on HD, as its light ray path is drawn by a two-dotted chain line in FIG. 7, the blue-violet semiconductor laser LD1 initially emits a light flux. The first collimator lens COL1 makes the divergent light flux emitted from the blue-violet semiconductor laser LD1 into a parallel light flux, and the polarizing beam splitter BS and the numerical aperture limit element AP transmit the light flux. The objective lens OBJ provides the light-converging action to the light flux and makes it into a spot formed on the information recording surface RL2 through the protective layer PL2 of HD. Herein, because the diffractive structure DOE2 is formed only in the numerical aperture $NA_2$ of HD, the aperture to HD is automatically limited.

The objective lens OBJ conducts the focusing or tracking by 2-axis actuator AC1 arranged in its periphery. An information pit on the information recording surface RL2 modulates the reflected light flux on the information recording surface RL2. The objective lens OBJ, the numerical aperture limit element AP, the polarizing beam splitter BS, and the first collimator lens COL1 transmit the modulated light flux again, make it into the convergence light flux, and converges it on the light receiving surface of the photo-detector PD1. Then, by using the output signal of the photo-detector PD1, the information recorded in HD can be read.

When the optical pickup apparatus PU2, records and/or reproduces information on DVD, the light emitting point EP1 emits a light flux. A prism PS reflects the divergent light flux by the light emitting point EP1 is, as its light ray path is drawn by a one-dotted chain line in FIG. 7. The polarizing beam splitter BS reflects the light flux and the second collimator lens COL2 converts the light flux into a parallel light flux. The aperture limit element AP transmits the light flux. The objective lens OBJ provides the light-converging action to the the light flux, and makes it into a spot formed on the information recording surface RL3 through the protective layer PL3 of DVD. Herein, because the diffractive structure HOE2 is formed only in the numerical aperture $NA_3$ of DVD, the aperture limitation to DVD is automatically conducted.

The objective lens OBJ conducts the focusing or tracking by 2-axis actuator AC1 arranged in its periphery.

An information pit on the information recording surface RL2 modulates the reflected light flux on the information recording surface RL2. The objective lens OBJ and the numerical aperture limit element AP transmit the modulated light flux again. The polarizing beam splitter BS reflects the light flux and the second collimator lens COL2 makes the light flux into the convergence light flux and converges it on the photo-detector PD1 after the prism PS reflects the light flux 2 times inside. Then, by using the output signal of the photo-detector PD1, the information recorded in DVD can be read.

Further, when the optical pickup apparatus PU2 records and/or reproduces information on CD, the light emitting point EP2 emits a light. A prism PS reflects the divergent light flux emitted from the light emitting point EP2, as its light ray path is drawn by a dotted line in FIG. 7, the second collimator lens COL2 converts the light flux into a parallel light. The polarizing beam splitter BS reflects the converted light flux and the aperture limit element AP regulates a light flux diameter. The objective lens OBJ provides the light-converging action to the light flux and makes it into a spot formed on the information recording surface RL4 through the protective layer PL4 of CD. The objective lens OBJ conducts the focusing or tracking by 2-axis actuator AC arranged in its periphery.

An information pit on the information recording surface RL4 modulates the reflected light flux on the information recording surface RL4. The objective lens OBJ and the numerical aperture limit element AP transmit the modulated light flux again and the polarizing beam splitter BS reflects the light flux. The light flux and is converged on the light receiving section DS2 after the prism PS reflects 2 times inside. Then, by using the output signal of the light receiving section DS2, the information recorded in CD can be read.

On the optical surface of the aperture limit element AP, a wavelength selection filter having the wavelength selectivity of the transmittance is formed. This wavelength selection filter has the wavelength selectivity of the transmittance which makes all wavelengths of $\lambda_1$ to $\lambda_3$ transmit in the area inside $NA_3$, and only the wavelength $\lambda_3$ is cut off in the area outside $NA_3$. By such a wavelength selectivity, the aperture to CD is limitation conducted.

EXAMPLES

Next, 7-examples of the multi-focal objective lens (Examples 1-7) appropriate for an objective lens OBJ used for the above optical pickup apparatus PU1 and PU2 will be described.

In Examples 1-7, an aberration correction element is a plastic lens, and a light-converging element is a glass lens used exclusively for BD. Hereupon, the light-converging element may also be a plastic lens.

Further, the specification of the light-converging element satisfies the followings: a numerical aperture is 0.85, focal distance is 1.765 mm, wavelength is 405 nm, magnification is 0, protective layer thickness is 0.1 mm.

Aspheric surface in each Example is, when a deformation amount from a plane contacting with an apex of the surface is X (mm), height in the direction perpendicular to the optical axis is h (mm), and a radius of curvature is r (mm), expressed by the equation in which aspheric surface coefficients $A_{2i}$ in Table 1 to Table 7 are substituted into the following Math-1. Where, κ is a conical coefficient.

$$X = \frac{h^2/r}{1+\sqrt{1-(1+\kappa)(h/r)^2}} + \sum_{i=2} A_{2i}h^{2i} \quad \text{[Math-1]}$$

Further, the diffractive structure DOE and the diffractive structure HOE in each Example are expressed by an optical path difference added to a wavefront of a transmitted light flux by these structures. Such an optical path difference is, when λ is a wavelength of an incident light flux, $\lambda_B$ is a manufactured wavelength, height in the direction perpendicular to the optical axis is h (mm), B2j is optical path difference function coefficient, and n is a diffraction order, expressed by a optical path difference function $\Phi_b$ (mm) defined by the following Math-2.

$$\Phi_b = \lambda/\lambda_B \times n \times \sum_{j=1} B_{2j}h^{2j} \quad \text{[Math-2]}$$

In the numeric data tables of examples shown below, $NA_1$, $f_1$, $\lambda_1$, $m_1$ are respectively the numerical aperture of the multi-focal objective lens when BD is used, focal distance of the multi-focal objective lens, wavelength of the multi-focal objective lens, magnification of the multi-focal objective lens, $NA_2$, $f_2$, $\lambda_1$, $m_2$ are same values when HD is used, $NA_3$, $f_3$, $\lambda_2$, $m_3$ are same values when DVD is used, and $NA_4$, $f_4$, $\lambda_3$, $m_4$ are same values when CD is used.

Further, r (mm) is a radius of curvature, d (mm) is a lens interval, $N_1$, $N_2$, $N_3$ are respectively refractive indexes to the wavelength $\lambda_1$, wavelength $\lambda_2$, wavelength $\lambda_3$, and $v_d$ is an Abbe's number of d-line.

Further, $n_1$, $n_2$, $n_3$, $n_4$ are, in the diffracted light flux generated in the diffractive structure DOE and the diffractive structure HOE, respectively, the diffraction order of the diffracted light flux used for the recording and/or reproducing of BD, diffraction order of the diffracted light flux used for the recording and/or reproducing of HD, diffraction order of the diffracted light flux used for the recording and/or reproducing DVD, and diffraction order of the diffracted light flux used for the recording and/or reproducing of CD.

Numeric data of the multi-focal objective lens of Example 1 will be shown in Table 1.

TABLE 1

(Optical specification)

BD: $NA_1$ = 0.85, $f_1$ = 1.765 mm, $\lambda_1$ = 405 nm, $m_1$ = 0, $d_4$ = 0.5312, $d_5$ = 0.1
HD: $NA_2$ = 0.65, $f_1$ = 1.787 mm, $\lambda_1$ = 405 nm, $m_2$ = 0, $d_4$ = 0.3044, $d_5$ = 0.6

(Paraxial data)

| Surface No. | r (mm) | d (mm) | $N_1$ | $v_d$ | Note |
|---|---|---|---|---|---|
| OBJ | ∞ | | | | Light Source |
| STO | | 0.5000 | | | Stop |
| 1 | ∞ | 1.0000 | 1.5247 | 56.5 | Aberration |
| 2 | ∞ | 0.2000 | | | Correction Element |
| 3 | 1.2372 | 2.1400 | 1.6227 | 61.2 | Light-Converging |
| 4 | −3.3048 | $d_4$ | | | Element |

TABLE 1-continued

| 5 | ∞ | $d_5$ | 1.6195 | 30.0 | Protective Layer |
|---|---|---|---|---|---|
| 6 | ∞ | | | | |

(Aspheric surface coefficient)

| | 1st surface | 3rd surface | 4th surface |
|---|---|---|---|
| κ | 0.0000E+00 | −6.5735E−01 | −1.1212E+02 |
| A4 | 1.2695E−04 | 1.5546E−02 | 1.5169E−01 |
| A6 | −1.4826E−04 | −1.0395E−03 | −2.5481E−01 |
| A8 | 7.7116E−05 | 1.0347E−02 | 3.5667E−01 |
| A10 | −1.4320E−05 | −9.7395E−03 | −3.7802E−01 |
| A12 | 0.0000E+00 | 2.9457E−03 | 2.1856E−01 |
| A14 | 0.0000E+00 | 3.9500E−03 | −5.1014E−02 |
| A16 | 0.0000E+00 | −4.3906E−03 | 0.0000E+00 |
| A18 | 0.0000E+00 | 1.7571E−03 | 0.0000E+00 |
| A20 | 0.0000E+00 | −2.6284E−04 | 0.0000E+00 |

(Diffraction order, manufactured wavelength, optical path difference function coefficient)

| | 1st surface |
|---|---|
| $n_1/n_2$ | 0/1 |
| λB | 405 nm |
| B2 | 1.3000E−02 |
| B4 | −1.5052E−03 |
| B6 | 2.9776E−04 |
| B8 | −5.6129E−04 |
| B10 | 4.9431E−05 |

The multi-focal objective lens in Example 1 is a BD/HD compatible lens, and the spherical aberration due to the difference between $t_1$ and $t_2$ is corrected by the diffractive structure DOE (the first diffractive structure) on the first surface.

In the diffractive structure DOE, $0^{th}$ order diffracted light flux (transmitted light) is used for BD, and 1-order diffracted light flux is used for HD, and the diffraction efficiency of BD ($0^{th}$ order diffracted light flux) is 40.5%, the diffraction efficiency of HD ($1^{st}$ order diffracted light flux) is 40.5%.

Hereupon, in the diffractive structure DOE, the depth d1 of the step closest to the optical axis is expressed by $d_1=0.5 \lambda_1/(N_1-1)=0.386$ (μm), however, when the above $d_1$ is changed within the range of expression (2), the design which attaches much importance to the diffraction efficiency of BD ($0^{th}$ order diffracted light flux), or the design which attaches much importance to the diffraction efficiency of HD ($1^{st}$ order diffracted light flux), may also be applied.

Further, because the paraxial diffraction power of the diffractive structure DOE is negative, the working distance of HD is 0.3 mm, and is sufficiently secured.

The numeric data of the multi-focal objective lens of Example 2 will be shown in Table 2.

TABLE 2

(Optical specification)

BD: $NA_1$ = 0.85, $f_1$ = 1.765 mm, $\lambda_1$ = 405 nm, $m_1$ = 0, $d_4$ = 0.5326, $d_5$ = 0.1
HD: $NA_2$ = 0.65, $f_2$ = 1.789 mm, $\lambda_1$ = 405 nm, $m_2$ = 0, $d_4$ = 0.3125, $d_5$ = 0.6

(Paraxial data)

| Surface No. | r (mm) | d (mm) | $N_1$ | $v_d$ | Note |
|---|---|---|---|---|---|
| OBJ | | ∞ | | | Light Source |
| STO | | 0.5000 | | | Stop |
| 1 | 9.4431 | 1.0000 | 1.5247 | 56.5 | Aberration |
| 2 | ∞ | 0.2000 | | | Correction Element |

TABLE 2-continued

| | | | | | |
|---|---|---|---|---|---|
| 3 | 1.2372 | 2.1400 | 1.6227 | 61.2 | Light-Converging |
| 4 | −3.3048 | $d_4$ | | | Element |
| 5 | ∞ | $d_5$ | 1.6195 | 30.0 | Protective Layer |
| 6 | ∞ | | | | |

(Aspheric surface coefficient)

| | 1st surface | 3rd surface | 4th surface |
|---|---|---|---|
| κ | 0.0000E+00 | −6.5735E−01 | −1.1212E+02 |
| A4 | −4.8644E−03 | 1.5546E−02 | 1.5169E−01 |
| A6 | −3.6311E−05 | −1.0395E−03 | −2.5481E−01 |
| A8 | −1.0154E−03 | 1.0347E−02 | 3.5667E−01 |
| A10 | −1.5229E−04 | −9.7395E−03 | −3.7802E−01 |
| A12 | 0.0000E+00 | 2.9457E−03 | 2.1856E−01 |
| A14 | 0.0000E+00 | 3.9500E−03 | −5.1014E−02 |
| A16 | 0.0000E+00 | −4.3906E−03 | 0.0000E+00 |
| A18 | 0.0000E+00 | 1.7571E−03 | 0.0000E+00 |
| A20 | 0.0000E+00 | −2.6284E−04 | 0.0000E+00 |

(Diffraction order, manufactured wavelength, optical path difference function coefficient)

| | 1st surface |
|---|---|
| $n_1/n_2$ | 2/3 |
| λB | 405 nm |
| B2 | 1.4000E−02 |
| B4 | −1.2568E−03 |
| B6 | 2.6886E−05 |
| B8 | −5.8513E−04 |
| B10 | −3.6134E−05 |

The multi-focal objective lens in Example 2 is a BD/HD compatible lens, and the spherical aberration due to the difference between $t_1$ and $t_2$ is corrected by the diffractive structure DOE (the first diffractive structure) on the first surface.

In the diffractive structure DOE, $2^{nd}$ order diffracted light flux (transmitted light) is used for BD, and $3^{rd}$ order diffracted light flux is used for HD, and the diffraction efficiency of BD ($2^{nd}$ order diffracted light flux) is 40.5%, the diffraction efficiency of HD ($3^{rd}$ order diffracted light flux) is 40.5%.

Hereupon, in the diffractive structure DOE, the depth $d_1$ of the step closest to the optical axis is expressed by $d_1=2.5\cdot\lambda_1/(N_1-1)=1.93$ (μm), however, when the above $d_1$ is changed within the range of expression (4), the design which attaches much importance to the diffraction efficiency of BD ($2^{nd}$ order diffracted light flux), or the design which attaches much importance to the diffraction efficiency of HD ($3^{rd}$ order diffracted light flux), may also be applied.

Further, because the paraxial diffraction power of the diffractive structure DOE is negative, the working distance of HD is 0.3 mm, and is sufficiently secured.

The numeric data of the multi-focal objective lens of Example 3 will be shown in Table 3.

TABLE 3

(Optical specification)

BD: $NA_1 = 0.85$, $f_1 = 1.765$ mm, $\lambda_1 = 405$ nm, $m_1 = 0$, $d_4 = 0.5325$, $d_5 = 0.1$
HD: $NA_2 = 0.65$, $f_2 = 1.776$ mm, $\lambda_1 = 405$ nm, $m_2 = 0$, $d_4 = 0.2657$, $d_5 = 0.6$ (Paraxial data)

| Surface No. | r (mm) | d (mm) | $N_1$ | $v_d$ | Note |
|---|---|---|---|---|---|
| OBJ | ∞ | | | | Light Source |
| STO | | 0.5000 | | | Stop |

TABLE 3-continued

| | | | | | |
|---|---|---|---|---|---|
| 1 | −19.5398 | 1.0000 | 1.5247 | 56.5 | Aberration Correction |
| 2 | ∞ | 0.2000 | | | Element |
| 3 | 1.2372 | 2.1400 | 1.6227 | 61.2 | Light-Converging |
| 4 | −3.3048 | $d_4$ | | | Element |
| 5 | ∞ | $d_5$ | 1.6195 | 30.0 | Protective Layer |
| 6 | ∞ | | | | |

(Aspheric surface coefficient)

| | 1st surface | 3rd surface | 4th surface |
|---|---|---|---|
| κ | 0.0000E+00 | −6.5735E−01 | −1.1212E+02 |
| A4 | 6.2156E−03 | 1.5546E−02 | 1.5169E−01 |
| A6 | 2.4932E−03 | −1.0395E−03 | −2.5481E−01 |
| A8 | 3.4299E−04 | 1.0347E−02 | 3.5667E−01 |
| A10 | 9.4055E−05 | −9.7395E−03 | −3.7802E−01 |
| A12 | 0.0000E+00 | 2.9457E−03 | 2.1856E−01 |
| A14 | 0.0000E+00 | 3.9500E−03 | −5.1014E−02 |
| A16 | 0.0000E+00 | −4.3906E−03 | 0.0000E+00 |
| A18 | 0.0000E+00 | 1.7571E−03 | 0.0000E+00 |
| A20 | 0.0000E+00 | −2.6284E−04 | 0.0000E+00 |

(Diffraction order, manufactured wavelength, optical path difference function coefficient)

| | 1st surface |
|---|---|
| $n_1/n_2$ | 2/1 |
| λB | 405 nm |
| B2 | −6.6139E−03 |
| B4 | 1.5994E−03 |
| B6 | 6.9663E−04 |
| B8 | 6.8361E−05 |
| B10 | 2.8922E−05 |

The multi-focal objective lens in Example 3 is a BD/HD compatible lens, and the spherical aberration due to the difference between $t_1$ and $t_2$ is corrected by the diffractive structure DOE (the first diffractive structure) on the first surface.

In the diffractive structure DOE, 2-order diffracted light flux (transmitted light) is used for BD, and $1^{st}$ order diffracted light flux is used for HD, and the diffraction efficiency of BD ($2^{nd}$ order diffracted light flux) is 40.5%, the diffraction efficiency of HD ($1^{st}$ order diffracted light flux) is 40.5%.

Hereupon, in the diffractive structure DOE, the depth $d_1$ of the step closest to the optical axis is expressed by $d_1=1.5\cdot\lambda_1/(N_1-1)=1.16$ (μm), however, when the above $d_1$ is changed within the range of expression (3), the design which attaches much importance to the diffraction efficiency of BD ($2^{nd}$ order diffracted light flux), or the design which attaches much importance to the diffraction efficiency of HD ($1^{st}$ order diffracted light flux), may also be applied.

Further, because the paraxial diffraction power of the diffractive structure DOE of the first surface is positive, the on-axial chromatic aberration of the blue-violet area can be finely corrected. The numeric data of the multi-focal objective lens of Example 4 will be shown in Table 4.

TABLE 4

(Optical specification)

BD: $NA_1 = 0.85$, $f_1 = 1.765$ mm, $\lambda_1 = 405$ nm, $m_1 = 0$, $d_4 = 0.5312$, $d_5 = 0.1$
HD: $NA_2 = 0.65$, $f_2 = 1.785$ mm, $\lambda_1 = 405$ nm, $m_2 = 0$, $d_4 = 0.3007$, $d_5 = 0.6$ (Paraxial data)

| Surface No. | r (mm) | d (mm) | $N_1$ | $v_d$ | Note |
|---|---|---|---|---|---|
| OBJ | ∞ | | | | Light Source |
| STO | | 0.5000 | | | Stop |

TABLE 4-continued

| 1 | −41.1202 | 1.0000 | 1.5247 | 56.5 | Aberration |
| 2 | 29.7426 | 0.2000 | | | Correction Element |
| 3 | 1.2372 | 2.1400 | 1.6227 | 61.2 | Light-Converging |
| 4 | −3.3048 | $d_4$ | | | Element |
| 5 | ∞ | $d_5$ | 1.6195 | 30.0 | Protective Layer |
| 6 | ∞ | | | | |

(Aspheric surface coefficient)

| | 1st surface | 2nd surface | 3rd surface | 4th surface |
|---|---|---|---|---|
| κ | 0.0000E+00 | 0.0000E+00 | −6.5735E−01 | −1.1212E+02 |
| A4 | 1.5455E−03 | 8.1819E−03 | 1.5546E−02 | 1.5169E−01 |
| A6 | −3.6622E−04 | −7.7567E−04 | −1.0395E−03 | −2.5481E−01 |
| A8 | 5.8573E−04 | 3.8134E−04 | 1.0347E−02 | 3.5667E−01 |
| A10 | −5.9042E−05 | 2.5412E−04 | −9.7395E−03 | −3.7802E−01 |
| A12 | 0.0000E+00 | 0.0000E+00 | 2.9457E−03 | 2.1856E−01 |
| A14 | 0.0000E+00 | 0.0000E+00 | 3.9500E−03 | −5.1014E−02 |
| A16 | 0.0000E+00 | 0.0000E+00 | −4.3906E−03 | 0.0000E+00 |
| A18 | 0.0000E+00 | 0.0000E+00 | 1.7571E−03 | 0.0000E+00 |
| A20 | 0.0000E+00 | 0.0000E+00 | −2.6284E−04 | 0.0000E+00 |

(Diffraction order, manufactured wavelength, optical path difference function coefficient)

| | 1st surface | 2nd surface |
|---|---|---|
| $n_1/n_2$ | −1/1 | 1/1 |
| λB | 405 nm | 405 nm |
| B2 | 6.2000E−03 | −9.0000E−03 |
| B4 | −7.6350E−04 | −4.3081E−03 |
| B6 | 1.1637E−04 | 3.9668E−04 |
| B8 | −2.6822E−04 | −1.9467E−04 |
| B10 | 2.3187E−05 | −1.3480E−04 |

The multi-focal objective lens in Example 4 is a BD/HD compatible lens, and the spherical aberration due to the difference between $t_1$ and $t_2$ is corrected by the diffractive structure HOE (the first diffractive structure) on the first surface.

In the diffractive structure HOE of the first surface, $-1^{st}$ order diffracted light flux is used for BD, and $1^{st}$ order diffracted light flux is used for HD, and the diffraction efficiency of BD ($-1^{st}$ order diffracted light flux) is 40.5%, the diffraction efficiency of HD ($1^{st}$ order diffracted light flux) is 40.5%.

Hereupon, in the diffractive structure HOE of the first surface, the depth D1 of the step formed in each ring-shaped zone is expressed by $D_1=0.5 \cdot \lambda_1/(N_1-1)=0.38$ (μm), and the number of divisions (the number of steps) of each ring-shaped zone is 2.

Further, because the paraxial diffraction power of the diffractive structure HOE of the first surface is negative, the working distance of HD is 0.3 mm, and is sufficiently secured.

Further, the spherical aberration change due to the wavelength change of BD, and the on-axial chromatic aberration in the blue-violet area are corrected by the diffractive structure DOE of the second surface.

In the diffractive structure DOE of the second surface, $+1^{st}$ order diffracted light flux of the light flux of wavelength $\lambda_1$ is used for respective optical discs, and their diffraction efficiencies are 100%.

Hereupon, in the diffractive structure DOE of the second surface, the depth $d_4$ of step closest to the optical axis is expressed by $d_4=1 \cdot \lambda_1/(N_1-1)=0.77$ (μm).

The numerical data of the multi-focal objective lens of Example 5 will be shown in Table 5.

TABLE 5

(Optical specification)

BD: $NA_1 = 0.85$, $f_1 = 1.765$ mm, $\lambda_1 = 405$ nm, $m_1 = 0$, $d_4 = 0.5320$, $d_5 = 0.1$ HD: $NA_2 = 0.65$, $f_2 = 1.785$ mm, $\lambda_1 = 405$ nm, $m_2 = 0$, $d_4 = 0.2989$, $d_5 = 0.6$ (Paraxial data)

| Surface No. | r (mm) | d (mm) | $N_1$ | $v_d$ | Note |
|---|---|---|---|---|---|
| OBJ | | ∞ | | | Light Source |
| STO | | 0.5000 | | | Stop |
| 1 | 22.1929 | 1.0000 | 1.5247 | 56.5 | Aberration |
| 2 | 9.3851 | 0.2000 | | | Correction Element |
| 3 | 1.2372 | 2.1400 | 1.6227 | 61.2 | Light-Converging |
| 4 | −3.3048 | $d_4$ | | | Element |
| 5 | ∞ | $d_5$ | 1.6195 | 30.0 | Protective Layer |
| 6 | ∞ | | | | |

(Aspheric surface coefficient)

| | 1st surface | 2nd surface | 3rd surface | 4th surface |
|---|---|---|---|---|
| κ | 0.0000E+00 | 1.1157E+01 | −6.5735E−01 | −1.1212E+02 |
| A4 | −2.9183E−03 | −2.4828E−03 | 1.5546E−02 | 1.5169E−01 |
| A6 | 2.8906E−04 | 3.7697E−04 | −1.0395E−03 | −2.5481E−01 |
| A8 | −9.6606E−04 | 0.0000E+00 | 1.0347E−02 | 3.5667E−01 |
| A10 | 8.3994E−05 | 0.0000E+00 | −9.7395E−03 | −3.7802E−01 |
| A12 | 0.0000E+00 | 0.0000E+00 | 2.9457E−03 | 2.1856E−01 |
| A14 | 0.0000E+00 | 0.0000E+00 | 3.9500E−03 | −5.1014E−02 |
| A16 | 0.0000E+00 | 0.0000E+00 | −4.3906E−03 | 0.0000E+00 |
| A18 | 0.0000E+00 | 0.0000E+00 | 1.7571E−03 | 0.0000E+00 |
| A20 | 0.0000E+00 | 0.0000E+00 | −2.6284E−04 | 0.0000E+00 |

(Diffraction order, manufactured wavelength, optical path difference function coefficient)

| | 1st surface | 2nd surface |
|---|---|---|
| $n_1/n_2$ | 1/2 | 2/2 |
| λB | 405 nm | 405 nm |
| B2 | 1.2000E−02 | −1.4000E−02 |
| B4 | −1.5742E−03 | 1.6473E−04 |
| B6 | 2.2983E−04 | −1.3103E−04 |
| B8 | −5.4707E−04 | −2.8668E−06 |
| B10 | 5.2031E−05 | −5.3876E−07 |

The multi-focal objective lens in Example 5 is a BD/HD compatible lens, and the spherical aberration due to the difference between $t_1$ and $t_2$ is corrected by the diffractive structure DOE (the first diffractive structure) on the first surface.

In the diffractive structure DOE, 1st order diffracted light flux is used for BD, and 2nd order diffracted light flux is used for HD, and the diffraction efficiency of BD ($1^{st}$ order diffracted light flux) is 40.5%, the diffraction efficiency of HD ($2^{nd}$ order diffracted light flux) is 40.5%.

Hereupon, in the diffractive structure DOE of the first surface, the depth $d_1$ of the step closest to the optical axis is expressed by $d_1=1.5 \cdot_1/(N_1-1)=1.16$ (μm), however, when the above $d_1$ is changed in the range of expression (3), the design which attaches importance to the diffraction efficiency of BD ($1^{st}$ order diffracted light flux), or which attaches importance to the diffraction efficiency of HD ($2^{nd}$ order diffracted light flux), may also be applied.

Further, because the paraxial diffraction power of the diffractive structure DOE of the first surface is negative, the working distance of HD is 0.3 mm, and is sufficiently secured.

Further, by the diffractive structure DOE of the second surface, the spherical aberration change following the wavelength change of BD and the on-axial chromatic aberration in the blue-violet area are corrected.

In the diffractive structure DOE of the second surface, $2^{nd}$ order diffracted light flux of the light flux of the wavelength $\lambda_1$ is used for respective optical discs, and their diffraction efficiencies are 100%. In the diffractive structure DOE of the second surface, the depth $d_A$ of the step closest to the optical axis is expressed by $d_A=2\cdot\lambda_1/(N_1-1)=1.54$ (μm).

The numeric data of the multi-focal objective lens of Example 6 will be shown in Table 6.

TABLE 6

(Optical specification)

BD: $NA_1 = 0.85$, $f_1 = 1.765$ mm, $\lambda_1 = 405$ nm, $m_1 = 0$, $d_{OBJ} = \infty$, $d_4 = 0.5323$, $d_5 = 0.1$
HD: $NA_2 = 0.65$, $f_2 = 1.785$ mm, $\lambda_1 = 405$ nm, $m_2 = 0$, $d_{OBJ} = \infty$, $d_4 = 0.2992$, $d_5 = 0.6$
DVD: $NA_3 = 0.65$, $f_3 = 1.843$ mm, $\lambda_2 = 655$ nm, $m_3 = 0$, $d_{OBJ} = \infty$, $d_4 = 0.3146$, $d_5 = 0.6$
CD: $NA_4 = 0.45$, $f_3 = 1.847$ mm, $\lambda_2 = 785$ nm, $m_4 = -1/12.17$, $d_{OBJ} = 22.5000$, $d_4 = 0.1131$, $d_5 = 1.2$ (Paraxial data)

| Surface No. | r (mm) | d (mm) | $N_1$ | $N_3$ | $N_4$ | $\nu_d$ | Note |
|---|---|---|---|---|---|---|---|
| OBJ | | $d_{OBJ}$ | | | | | *1 |
| STO | | 0.5000 | | | | | *2 |
| 1 | 22.1929 | 1.0000 | 1.5247 | 1.5065 | 1.5050 | 56.5 | *3 |
| 2 | 32.81901 | 0.2000 | | | | | |
| 3 | 1.2372 | 2.1400 | 1.6227 | 1.6032 | 1.5992 | 61.2 | *4 |
| 4 | −3.3048 | $d_4$ | | | | | |
| 5 | ∞ | $d_5$ | 1.6195 | 1.5772 | 1.5704 | 30.0 | *5 |
| 6 | ∞ | | | | | | |

Note:
*1 Light Source
*2 Stop
*3 Aberration Correction Element
*4 Light-Converging Element
*5 Protective Layer (Aspheric surface coefficient)

| | 1st surface | 2nd surface | 3rd surface | 4th surface |
|---|---|---|---|---|
| κ | 0.0000E+00 | 0.0000E+00 | −6.5735E−01 | −1.1212E+02 |
| A4 | −2.9183E−03 | −7.7155E−03 | 1.5546E−02 | 1.5169E−01 |
| A6 | 2.8906E−04 | −5.1371E−03 | −1.0395E−03 | −2.5481E−01 |
| A8 | −9.6606E−04 | 3.0935E−03 | 1.0347E−02 | 3.5667E−01 |
| A10 | 8.3994E−05 | −1.3624E−03 | −9.7395E−03 | −3.7802E−01 |
| A12 | 0.0000E+00 | 0.0000E+00 | 2.9457E−03 | 2.1856E−01 |
| A14 | 0.0000E+00 | 0.0000E+00 | 3.9500E−03 | −5.1014E−02 |
| A16 | 0.0000E+00 | 0.0000E+00 | −4.3906E−03 | 0.0000E+00 |
| A18 | 0.0000E+00 | 0.0000E+00 | 1.7571E−03 | 0.0000E+00 |
| A20 | 0.0000E+00 | 0.0000E+00 | −2.6284E−04 | 0.0000E+00 |

(Diffraction order, manufactured wavelength, optical path difference function coefficient)

| | 1st surface | 2nd surface |
|---|---|---|
| $n_1/n_2/n_3/n_4$ | 1/2/1/1 | 2/2/1/1 |
| λB | 405 nm | 405 nm |
| B2 | 1.2000E−02 | −4.0000E−03 |
| B4 | −1.5742E−03 | 2.0302E−03 |
| B6 | 2.2983E−04 | 1.3411E−03 |
| B8 | −5.4707E−04 | −8.0886E−04 |
| B10 | 5.2031E−05 | 3.5700E−04 |

The multi-focal objective lens in Example 6 is a BD/HD/DVD/CD compatible lens, and the spherical aberration due to the difference between $t_1$ and $t_2$ is corrected by the diffractive structure DOE (the first diffractive structure) on the first surface (the first optical surface).

In the diffractive structure HOE of the first surface, $1^{st}$ order diffracted light flux is used for BD, and $2^{nd}$ order diffracted light flux is used for HD, $1^{st}$ order diffracted light flux is used for DVD, $1^{st}$ order diffracted light flux is used for CD, and the diffraction efficiency of BD ($1^{st}$ order diffracted light flux) is 40.5%, the diffraction efficiency of HD ($2^{nd}$ order diffracted light flux) is 40.5%, the diffraction efficiency of DVD ($1^{st}$ order diffracted light flux) is 96.4%, and the diffraction efficiency of CD ($1^{st}$ order diffracted light flux) is 80.3%.

Hereupon, in the first diffractive structure DOE, the depth $d_1$ of the step closest to the optical axis is expressed by $d_1=1.5\cdot\lambda_1/(N_1-1)=1.16$ (μm), however, when the above $d_1$ is changed in the range of expression (3), the design which attaches importance to the diffraction efficiency of BD ($1^{st}$ order diffracted light flux), or which attaches importance to the diffraction efficiency of HD ($2^{nd}$ order diffracted light flux), may also be applied.

Further, because the paraxial diffraction power of the diffractive structure DOE of the first surface is negative, the working distance of HD is 0.3 mm, and is sufficiently secured.

Further, the spherical aberration due to the difference between $t_1$ and $t_2$ is corrected by the diffractive structure DOE (the third diffractive structure) of the second surface (the second optical surface).

In the diffractive structure DOE of the second surface, 2-order diffracted light flux is used for BD and HD, $1^{st}$ order diffracted light flux is used for DVD, $1^{st}$ order diffracted light flux is used for CD, and the diffraction efficiency of BD and HD ($2^{nd}$ order diffracted light flux) is 100%, the diffraction efficiency of DVD ($1^{st}$ order diffracted light flux) is 88.2%, and the diffraction efficiency of CD ($+1^{st}$ order diffracted light flux) is 100%.

Further, in the total sum of the diffraction efficiencies of the above two diffractive structures, BD is 40.5%, HD is 40.5%, DVD is 85.0%, and CD is 80.3%.

Hereupon, in the diffractive structure DOE of the second surface, the depth $d_A$ of step closest to the optical axis expressed by $d_0=2\cdot\lambda_1/(N_1-1)=1.54$ (μm).

Further, in the present example, when the light flux of wavelength $\lambda_3$ is incident on under the condition of divergent light, the spherical aberration due to the difference between $t_1$ and $t_4$ is corrected.

The numeric data of the multi-focal objective lens of Example 7 will be shown in Table 7.

TABLE 7

(Optical specification)

BD: $NA_1 = 0.85$, $f_1 = 1.765$ mm, $\lambda_1 = 405$ nm, $m_1 = 0$, $d_6 = 0.5312$, $d_7 = 0.1$
HD: $NA_2 = 0.65$, $f_2 = 1.748$ mm, $\lambda_1 = 405$ nm, $m_2 = 0$, $d_6 = 0.2970$, $d_5 = 0.6$
DVD: $NA_3 = 0.65$, $f_3 = 1.808$ mm, $\lambda_2 = 655$ nm, $m_3 = 0$, $d_6 = 0.3306$, $d_7 = 0.6$
CD: $NA_4 = 0.45$, $f_3 = 2.047$ mm, $\lambda_2 = 785$ nm, $m_4 = 0$, $d_6 = 0.3046$, $d_7 = 1.2$ (Paraxial data)

| Surface No. | r (mm) | $d_1$ (mm) | $N_1$ | $N_3$ | $N_4$ | $\nu_d$ | Note |
|---|---|---|---|---|---|---|---|
| OBJ | | ∞ | | | | | *1 |
| STO | | 0.5000 | | | | | *2 |
| 1 | 22.2265 | 1.0000 | 1.5247 | 1.5065 | 1.5050 | 56.5 | *3 |
| 2 | 10.5780 | 0.3000 | | | | | |
| 3 | ∞ | 1.0000 | 1.5247 | 1.5065 | 1.5050 | 56.5 | *3' |
| 4 | ∞ | 0.1000 | | | | | |
| 5 | 1.2372 | 2.1400 | 1.6227 | 1.6032 | 1.5992 | 61.2 | *4 |
| 6 | −3.3048 | $d_6$ | | | | | |

TABLE 7-continued

| 7 | ∞ | $d_7$ | 1.6195 | 1.5772 | 1.5704 | 30.0 | *5 |
| 8 | ∞ | | | | | | |

Note:
*1 Light Source
*2 Stop
*3 The First Aberration Correction Element
*3' The Second Aberration Correction Element
*4 Light-Converging Element
*5 Protective Layer (Aspheric surface coefficient)

| | 1st surface | 2nd surface | 5th surface | 6th surface |
|---|---|---|---|---|
| κ | 0.0000E+00 | −1.1484E−01 | −6.5735E−01 | −1.1212E+02 |
| A4 | −2.4573E−03 | −4.6776E−04 | 1.5546E−02 | 1.5169E−01 |
| A6 | −9.1874E−04 | 3.8693E−05 | −1.0395E−03 | −2.5481E−01 |
| A8 | −2.5858E−04 | −7.4545E−05 | 1.0347E−02 | 3.5667E−01 |
| A10 | −6.2955E−05 | 2.9339E−05 | −9.7395E−03 | −3.7802E−01 |
| A12 | 0.0000E+00 | 0.0000E+00 | 2.9457E−03 | 2.1856E−01 |
| A14 | 0.0000E+00 | 0.0000E+00 | 3.9500E−03 | −5.1014E−02 |
| A16 | 0.0000E+00 | 0.0000E+00 | −4.3906E−03 | 0.0000E+00 |
| A18 | 0.0000E+00 | 0.0000E+00 | 1.7571E−03 | 0.0000E+00 |
| A20 | 0.0000E+00 | 0.0000E+00 | −2.6284E−04 | 0.0000E+00 |

(Diffraction order, manufactured wavelength, optical path difference function coefficient)

| | 1st surface | 2nd surface | 3rd surface | 4th surface |
|---|---|---|---|---|
| $n_1/n_2/n_3/n_4$ | 1/2/1/1 | 2/2/1/1 | 0/0/1/0 | 0/0/0/1 |
| λB | 405 nm | 405 nm | 655 nm | 785 nm |
| B2 | 1.2000E−02 | −1.2500E−02 | 1.0000E−04 | 4.4000E−02 |
| B4 | −1.3486E−03 | 8.6475E−05 | −9.8590E−04 | −3.9547E−03 |
| B6 | −3.8137E−04 | −1.1517E−05 | 7.4516E−04 | 1.1697E−02 |
| B8 | −1.8689E−04 | 2.0661E−05 | −5.5261E−04 | −7.2599E−03 |
| B10 | −2.3160E−05 | −8.2219E−06 | 9.7725E−05 | 3.0760E−03 |

The multi-focal objective lens in Example 7 is a BD/HD/DVD/CD compatible lens, and the spherical aberration due to the difference between $t_1$ and $t_2$ is corrected by the diffractive structure DOE (the first diffractive structure) on the first surface (the first optical surface).

In the diffractive structure DOE of the first surface, $1^{st}$ order diffracted light flux is used for BD, $2^{nd}$ order diffracted light flux is used for HD, $1^{st}$ order diffracted light flux is used for DVD, and 1-order diffracted light flux is used for CD, and the diffraction efficiency of BD ($1^{st}$ order diffracted light flux) is 40.5%, the diffraction efficiency of HD ($2^{nd}$ order diffracted light flux) is 40.5%, the diffraction efficiency of DVD ($1^{st}$ order diffracted light flux) is 96.4%, and the diffraction efficiency of CD ($1^{st}$ order diffracted light flux) is 80.3%.

In the diffractive structure DOE of the first surface, the depth $d_1$ of the step closest to the optical axis is expressed by $d_1=1.5\cdot\lambda_1/(N_1-1)=1.16$ (μm), however, when the above $d_1$ is changed within the range of expression (3), the design which attaches importance to the diffraction efficiency of BD ($1^{st}$ order diffracted light flux), or which attaches importance to the diffraction efficiency of HD ($2^{nd}$ order diffracted light flux), may also be applied.

Further, because the paraxial diffraction power of the diffractive structure DOE of the first surface is negative, the working distance of HD is 0.3 mm, and is sufficiently secured.

Further, by the diffractive structure DOE of the second surface, the spherical aberration change following the wavelength change of BD and the on-axial chromatic aberration in the blue-violet area are corrected.

In the diffractive structure DOE of the second surface, $2^{nd}$ order diffracted light flux is used for BD and HD, $1^{st}$ order diffracted light flux is used for DVD, $1^{st}$ order diffracted light flux is used for CD, and the diffraction efficiency of BD and HD ($2^{nd}$ order diffracted light flux) is 100%, the diffraction efficiency of DVD ($1^{st}$ order diffracted light flux) is 88.2%, and the diffraction efficiency of CD ($1^{st}$ order diffracted light flux) is 100%.

Hereupon, in the diffractive structure DOE of the second surface, the depth dc of step closest to the optical axis is expressed by $d_C=2\cdot\lambda_1/(N_1-1)=1.54$ (μm).

Further, by the diffractive structure HOE (the second diffractive structure) of the third surface, the spherical aberration due to the difference between $t_1$ and $t_3$ is corrected.

In the diffractive structure HOE of the third surface, $0^{th}$ order diffracted light flux (transmitted light) is used for BD and HD, $1^{st}$ order diffracted light flux is used for DVD, $0^{th}$ order diffracted light flux (transmitted light) is used for CD, and the diffraction efficiency of BD and HD ($0^{th}$ order diffracted light flux) is 100%, the diffraction efficiency of DVD ($1^{st}$ order diffracted light flux) is 87.3%, and the diffraction efficiency of CD ($0^{th}$ order diffracted light flux) is 100%.

Hereupon, the depth $D_2$ of the step formed in each ring-shaped zone is expressed by $D_2=2\cdot\lambda_1/(N_1-1)=1.54$ (μm), and the number of divisions (the number of steps) of each ring-shaped zone is 5.

Further, by the diffractive structure HOE of the fourth surface, the spherical aberration due to the difference between $t_1$ and $t_4$ is corrected.

In the diffractive structure HOE of the fourth surface, 0-order diffracted light flux (transmitted light) is used for BD, HD and DVD, $1^{st}$ order diffracted light flux is used for CD, and the diffraction efficiency of BD, HD and DVD ($0^{th}$ order diffracted light flux) is 100%, and the diffraction efficiency of CD ($1^{st}$ order diffracted light flux) is 40.4%.

Hereupon, the depth $D_3$ of the step formed in each ring-shaped zone is expressed by $D_3=5\cdot\lambda_1/(N_1-1)=3.86$ (μm), and the number of divisions (the number of steps) of each ring-shaped zone is 2.

In the total sum of the diffraction efficiencies of the 4 diffractive structures, the diffraction efficiency of BD is 40.5%, that of HD is 40.5%, that of DVD is 74.1%, and that of CD is 32.4%.

In the following Table 8, values of each example of $|SA_m-SA_n|$, $SA_m$, and $SA_n$ will be shown.

TABLE 8

| | Example No. | | | | | | |
|---|---|---|---|---|---|---|---|
| | 1 | 2 | 3 | 4 | 5 | 6 | 7 |
| $|SA_m - SA_n|$ | 1.159 | 1.159 | 1.158 | 1.162 | 1.160 | 1.160 | 1.093 |
| $SA_m$ | 0.001 | 0.002 | 0.003 | 0.000 | 0.001 | 0.001 | 0.003 |
| $SA_n$ | 1.160 | 1.161 | 1.161 | 1.162 | 1.161 | 1.161 | 1.096 |

Where, m = $n_2$, n = $n_1$, $NA_2$ = 0.65, and the unit of wave-front aberration is $\lambda_1$ RMS ($\lambda_1$ = 405 nm).

What is claimed is:

1. A multi-focal objective lens for use in an optical pickup apparatus for recording and/or reproducing information using a first light flux with a wavelength $\lambda_1$, wherein $\lambda_1 \leq 450$ nm, on a first optical disc with a protective layer with a thickness $t_1$ and a second optical disc with a protective layer with a thickness $t_2$, wherein $t_1 < t_2$, the multi-focal objective lens comprising:

a first optical surface including a first diffractive structure which has a plurality of ring-shaped zones and generates a m-th diffracted light flux and a n-th diffracted light flux, wherein m≠n, from the first light flux entering into the first diffractive structure, wherein each of the plurality of ring-shaped zones is divided by steps, the multi-focal objective lens converges a diffracted light flux with one of a m-th diffraction order and a n-th diffraction order on an information recording surface of the first optical disc for recording and/or reproducing information of the first optical disc, and the multi-focal objective lens converges a diffracted light flux with another of the m-th diffraction order and the n-th diffraction order on an information recording surface of the second optical disc for recording and/or reproducing information of the second optical disc.

2. The multi-focal objective lens of claim 1, wherein when the multi-focal objective lens converges the m-th diffracted light flux on an information recording surface through the protective layer of the second optical disc, a wavefront of the converged m-th diffracted light flux has a spherical aberration $SA_m$, when the multi-focal objective lens converges the n-th diffracted light flux on an information recording surface through the protective layer of the second optical disc, a wavefront of the converged n-th diffracted light flux has a spherical aberration amount $SA_n$, an absolute value of $SA_m$ or $SA_n$ is $0.07 \lambda_1$ RMS or less, and $SA_m$ and $SA_n$ satisfies $$|SA_m - SA_n| \geq 0.9 \lambda_1 \text{ RMS}.$$

3. The multi-focal objective lens of claim 1, wherein when the first diffractive structure generates diffracted light fluxes from the first light flux entering into the first diffractive structure, diffracted light fluxes with a highest diffraction efficiency and a second highest diffraction efficiency among the diffracted light fluxes are the m-th diffracted light flux and the n-th light flux respectively.

4. The multi-focal objective lens of claim 3, wherein a diffraction efficiency $\eta m$ of the m-th diffracted light flux and a diffraction efficiency $\eta n$ of the n-th diffracted light flux satisfy $\eta m > \eta n$.

5. The multi-focal objective lens of claim 3, wherein a diffraction efficiency $\eta m$ of the m-th diffracted light flux and a diffraction efficiency in of the n-th diffracted light flux satisfy $\eta m = \eta n$.

6. The multi-focal objective lens of claim 3, wherein a diffraction efficiency $\eta m$ of the m-th diffracted light flux and a diffraction efficiency $\eta n$ of the n-th diffracted light flux satisfy $\eta m < \eta n$.

7. The multi-focal objective lens of claim 1, wherein a diffraction order m of the m-th diffracted light flux is integer and 1 or more, and the diffraction order m and a diffraction order n of the n-th diffracted light flux satisfy $n = m - 1$.

8. The multi-focal objective lens of claim 7, wherein a combination of the diffraction order m and the diffraction order n satisfies one of followings:

(m, n) = (1, 0), (2, 1), (3, 2).

9. The multi-focal objective lens of claim 8, wherein a refractive index $N_1$ of the multi-focal objective lens for the wavelength $\lambda_1$ is in a range of 1.5 to 1.6, and the multi-focal objective lens satisfy one of following expressions:

$$0.27 < d_1 < 0.48$$

$$1.02 < d_1 < 1.24$$

$$1.72 < d_1 < 2.02$$

where $d_1$ is a depth (μm) of a step which is closest to an optical axis among the steps.

10. The multi-focal objective lens of claim 7, wherein a depth $d_1$ (μm) of a step which is closest to an optical axis among the steps, the wavelength $\lambda_1$ (μm), and a refractive index $N_1$ of the multi-focal objective lens for the wavelength $\lambda_1$ satisfy $$0.4 \leq |INT(X) - X| \leq 0.5$$

where, $X = d_1 \cdot (N_1 - 1)/\lambda_1$, and

INT(X) is an integer value closest to X.

11. The multi-focal objective lens of claim 1, wherein each of the plurality of ring-shaped zones of the first diffractive structure includes a step structure, a diffraction order m of the m-th diffracted light flux is integer and 1 or more, and the diffraction order m and a diffraction order n of the n-th diffracted light flux satisfy $n = -m$.

12. The multi-focal objective lens of claim 11, wherein a step depth $D_1$ (μm) of the step structure of the first diffractive structure, the wavelength $\lambda_1$ (μm), and a refractive index $N_1$ of the multi-focal objective lens for the wavelength $\lambda_1$ satisfy $$D_1 \cdot (N_1 - 1)/\lambda_1 = q1 - 0.5$$

where, q1 is a natural number.

13. The multi-focal objective lens of claim 12, wherein when the step structure of each of the plurality of ring-shaped zones of the first diffractive structure is divided into steps, a number of the steps $M_1$ of the first diffractive structure is an even number.

14. The multi-focal objective lens of claim 1, wherein the multi-focal objective lens converges a diffracted light flux with a higher diffraction order of the m-th diffraction order and the n-th diffraction order on an information recording surface of the second optical disc, and converges a diffracted light flux with a lower diffraction order of the m-th diffraction order and the n-th diffraction order on an information recording surface of the first optical disc.

15. The multi-focal objective lens of claim 14, wherein the multi-focal objective lens has a negative paraxial diffractive power of the first diffractive structure.

16. A multi-focal objective lens for use in an optical pickup apparatus for recording and/or reproducing information using a first light flux with a wavelength $\lambda_1$ wherein $\lambda_1 \leq 450$ nm, on a first optical disc with a protective layer with a thickness $t_1$ and a second optical disc with a protective layer with a thickness $t_2$ wherein $t_1 < t_2$ and for recording and/or reproducing information using a second light flux with a wavelength $\lambda_2$ wherein 630 nm $< \lambda_2 < 680$ nm, on a third optical disc with a protective layer with a thickness $t_3$ which is a different kind from the first and second optical discs, the multi-focal objective lens comprising:

a first optical surface including a first diffractive structure and a second optical surface including a second diffractive structure, wherein the first diffractive structure has a plurality of ring-shaped zones divided by steps and generates a m-th diffracted light flux and a n-th diffracted light flux wherein m≠n, from the first light flux entering into the first diffractive structure, and the second diffractive structure has a plurality of ring-shaped zones divided by steps and generates a v-th diffracted light flux from the second light flux entering into the second diffractive structure, the multi-focal objective lens converges a diffracted light flux with one of a m-th diffraction order and a n-th diffraction order on an information recording surface of the first optical disc for recording and/or reproducing information of the first optical disc, converges a diffracted light flux with another of the m-th diffraction order and the n-th diffraction order on an information recording surface of the second optical disc for recording and/or reproducing information of the second optical disc, and converges the v-th diffracted light flux on an information recording surface of the third optical disc for recording and/or reproducing information of the third optical disc.

17. The multi-focal objective lens of claim 16, wherein when the first diffractive structure generates diffracted light fluxes from the first light flux entering into the first diffractive structure, diffracted light fluxes with a highest diffraction efficiency and a second highest diffraction efficiency among the diffracted light fluxes have the m-th diffracted light flux and the n-th light flux respectively.

18. The multi-focal objective lens of claim 16, wherein a diffraction order m of the m-th diffracted light flux is integer and 1 or more, and
the diffraction order m and a diffraction order n of the n-th diffracted light flux satisfy n=m−1.

19. The multi-focal objective lens of claim 16, wherein a diffraction order m of the m-th diffracted light flux is integer and 1 or more, and
the diffraction order m and a diffraction order n of the n-th diffracted light flux satisfy n=−m.

20. The multi-focal objective lens of claim 16, wherein the second optical surface having the second diffractive structure is a different surface from the first optical surface.

21. The multi-focal objective lens of claim 20, wherein each of the plurality of ring-shaped zones of the second diffractive structure includes a step structure,
the step structure does not provide a phase difference to the first light flux and
provides a phase difference to the second light flux.

22. The multi-focal objective lens of claim 21, wherein a step depth $D_2$ (μm) of the step structure of the second diffractive structure,
the wavelength $\lambda_1$ (μm), and
a refractive index $N_1$ of the multi-focal objective lens for the wavelength $\lambda_1$ satisfies $D_2 \cdot (N_1-1)/\lambda_1 = 2 \cdot q2$ where, q2 is a natural number and a number of the steps $M_2$ of the step structure of the second diffractive structure is one of 4, 5 and 6.

23. The multi-focal objective lens of claim 20, wherein when the second diffractive structure generates diffracted light fluxes from the first light flux entering into the second diffractive structure, a diffracted light flux with a highest diffraction efficiency among the diffracted light fluxes is a w-th diffracted light flux and diffraction orders of the w-th diffracted light flux and the v-th diffracted light flux satisfy w>v.

24. The multi-focal objective lens of claim 23, wherein the diffraction orders of the w-th diffracted light flux and the v-th diffracted light flux satisfy w=2 and v=1.

25. The multi-focal objective lens of claim 23, wherein the diffraction orders of the w-th diffracted light flux and the v-th diffracted light flux satisfy w=3 and v=2.

26. An optical pickup apparatus for recording and/or reproducing information on a first optical disc with a protective layer with a thickness $t_1$ and a second optical disc with a protective layer with a thickness $t_2$ wherein $t_1 < t_2$, the optical pickup apparatus comprising:

a light source for emitting a first light flux with a wavelength $\lambda_1$ wherein $\lambda_1 \leq 450$ nm, and for recording and/or reproducing information on the first and the second discs;

a multi-focal objective lens having
a first optical surface including a first diffractive structure which has a plurality of ring-shaped zones divided by steps and generates a m-th diffracted light flux and a n-th diffracted light flux wherein m≠n, from the first light flux entering into the first diffractive structure; and an actuator for actuating the multi-focal objective lens in two directions for tracking and focusing the multi-focal objective lens;

wherein the multi-focal objective lens converges a diffracted light flux with one of the m-th diffraction order and the n-th diffraction order on an information recording surface of the first optical disc for recording and/or reproducing information on the first optical disc, and converges a diffracted light flux with another of the m-th diffraction order and the n-th diffraction order on an information recording surface of the second optical disc for recording and/or reproducing information on the second optical disc.

27. The optical pickup apparatus of claim 26, wherein when the multi-focal objective lens converges the m-th diffracted light flux on an information recording surface of the second optical disc, a wavefront of the converged m-th diffracted light flux has a spherical aberration $SA_m$, when the multi-focal objective lens converges the n-th diffracted light flux on an information recording surface of the second optical disc, a wavefront of the converged n-th diffracted light flux has a spherical aberration amount $SA_n$, and an absolute value of $SA_m$ or $SA_n$ is 0.07 $\lambda_1$ RMS or more, and $SA_m$ and $SA_n$ satisfies $|SA_m - SA_n| \geq 0.9 \lambda_1$ RMS.

28. The optical pickup apparatus of claim 26, wherein when the first diffractive structure generates diffracted light fluxes from the first light flux entering into the first diffractive structure, diffracted light fluxes with a highest diffraction efficiency and a second highest diffraction efficiency among the diffracted light fluxes are the m-th diffracted light flux and the n-th light flux respectively.

29. The optical pickup apparatus of claim 26, wherein a diffraction order m of the m-th diffracted light flux is integer and 1 or more, and
the diffraction order m and a diffraction order n of the n-th diffracted light flux satisfy n=m−1.

30. The optical pickup apparatus of claim 29,
wherein a combination of the diffraction order m and the diffraction order n satisfies one of following:
(m, n)=(1, 0), (2, 1), (3, 2).

31. The optical pickup apparatus of claim 30,
wherein a refractive index $N_1$ of the multi-focal objective lens for the wavelength $\lambda_1$ is in a range of 1.5 to 1.6, and
the multi-focal objective lens safeties one of following expressions:

$$0.27 < d_1 < 0.48$$

$$1.02 < d_1 < 1.24$$

$$1.72 < d_1 < 2.02$$

where $d_1$ is a depth (μm) of a step which is closest to an optical axis among the steps.

32. The optical pickup apparatus of claim 29,
wherein a depth $d_1$ (μm) of a step which is closest to an optical axis among the steps,
the wavelength $\lambda_1$ (μm), and
a refractive index $N_1$ of the multi-focal objective lens for the wavelength $\lambda_1$ satisfy $$0.4 \leq |INT(X)-X| \leq 0.5$$

where, $X=d_1 \cdot (N_1-1)/\lambda_1$, and
$INT(X)$ is an integer value closest to X.

33. The optical pickup apparatus of claim 26,
wherein each of the plurality of ring-shaped zones of the first diffractive structure includes a step structure,
a diffraction order m of the m-th diffracted light flux is integer and 1 or more, and
the diffraction order m and a diffraction order n of the n-th diffracted light flux satisfy n=−m.

34. The optical pickup apparatus of claim 33,
wherein a step depth $D_1$ (μm) of the step structure of the first diffractive structure,
the wavelength $\lambda_1$ (μm), and
a refractive index $N_1$ of the multi-focal objective lens for the wavelength $\lambda_1$ satisfy $$D_1(N_1-1)/\lambda_1 = q1-0.5$$

where, q1 is a natural number.

35. The optical pickup apparatus of claim 34,
wherein when the step structure of each of the plurality of ring-shaped zones of the first diffractive structure is divided into steps, a number of the steps $M_1$ of the first diffractive structure is an even number.

36. The optical pickup apparatus of claim 34,
wherein the multi-focal objective lens converges a diffracted light flux with a higher diffraction order of the m-th diffraction order and the n-th diffraction order on an information recording surface of the second optical disc, and
converges a diffracted light flux with a lower diffraction order of the m-th diffraction order and the n-th diffraction order on an information recording surface of the first optical disc.

37. The optical pickup apparatus of claim 26,
wherein the multi-focal objective lens includes
a first area where a center-part light flux partially including the first and second light fluxes and including an optical axis passes through,
a second area where an outer-part light flux which is outer part of the center-part light fluxes passes through,
the multi-focal objective lens converges the first light flux passing through the first area and the second area onto an information recording surface of the first optical disc when recording and/or reproducing information on the first optical disc,
converges the first light flux passing through the first area onto an information recording surface of the second optical disc when recording and/or reproducing information on the second optical disc, and
makes the first light flux passing through the second area into a flare light which is not converged onto an information recording surface of the second optical disc when recording and/or reproducing information on the second optical disc.

38. An optical pickup apparatus for recording and/or reproducing information on a first optical disc having a protective layer with a thickness $t_1$, a second optical disc having a protective layer with a thickness $t_2$ wherein $t_1 < t_2$, and a third optical disc having a protective layer with a thickness $t_3$ which is a different kind from the first and second optical discs, the optical pickup apparatus comprising:

a first light source for emitting a first light flux with a wavelength $\lambda_1$ wherein $\lambda_1 \leq 450$ nm and for recording and/or reproducing information on the first and the second discs;

a second light source for emitting a second light flux with a wavelength $\lambda_2$ wherein $\lambda_1 \leq 450$ nm for recording and/or reproducing information on the third disc;

a multi-focal objective lens for converging each of the first and second light fluxes onto an information recording surface of a corresponding optical disc among the first to third optical discs; and an actuator for actuating the multi-focal objective lens in two directions for tracking and focusing the multi-focal objective lens;

wherein the multi-focal objective lens includes a first optical surface including a first diffractive structure which has a plurality of ring-shaped zones divided by steps and generates a m-th diffracted light flux and a n-th diffracted light flux wherein m≠n, from the first light flux entering into the first diffractive structure, and a second optical surface including a second diffractive structure which has a plurality of ring-shaped zones divided by steps and generates a v-th diffracted light flux from the second light flux entering into the second diffractive structure, the multi-focal objective lens converges a diffracted light flux with one of the m-th diffraction order and the n-th diffraction order on an information recording surface of the first optical disc for recording and/or reproducing information of the first optical disc, converges a diffracted light flux with another of the m-th diffraction order and the n-th diffraction order on an information recording surface of the second optical disc for recording and/or reproducing information of the second optical disc, and converges a v-th diffracted light flux on an information recording surface of the third optical disc for recording and/or reproducing information of the third optical disc.

39. The optical pickup apparatus of claim 38,
wherein when the first diffractive structure generates diffracted light fluxes from the first light flux entering into the first diffractive structure, diffracted light fluxes with a highest diffraction efficiency and a second highest diffraction efficiency among the diffracted light fluxes have the m-th diffracted light flux and the n-th light flux respectively.

40. The optical pickup apparatus of claim 38,
wherein a diffraction order m of the m-th diffracted light flux is integer and 1 or more, and
the diffraction order m and a diffraction order n of the n-th diffracted light flux satisfy n=m−1.

41. The optical pickup apparatus of claim 38,
wherein the plurality of ring-shaped zones of the first diffractive structure includes a step structure, and
the diffraction order m and a diffraction order n of the n-th diffracted light flux satisfy n=−m.

42. The optical pickup apparatus of claim 38,
wherein the second optical surface having the second diffractive structure is a different surface from the first optical surface.

43. The optical pickup apparatus of claim 38,
wherein each of the plurality of ring-shaped zones of the second diffractive structure includes a step structure,
the step structure does not provide a phase difference to the first light flux and
provides a phase difference to the second light flux.

44. The optical pickup apparatus of claim 43,
wherein a step depth $D_2$ (μm) of the step structure of the second diffractive structure,
the wavelength $\lambda_1$ (μm), and
a refractive index $N_1$ of the multi-focal objective lens for the wavelength $\lambda_1$ satisfy $$D_2(N_1-1)/\lambda_1 = 2 \cdot q2$$

where, q2 is a natural number and a number of the steps $M_2$ of the second diffractive structure is one of 4, 5 and 6.

45. The optical pickup apparatus of claim 39,
wherein when the second diffractive structure generates diffracted light fluxes from the first light flux entering into the second diffractive structure, a diffracted light flux with a highest diffraction efficiency among the diffracted light fluxes is a w-th diffracted light flux and diffraction orders of the w-th diffracted light flux and the v-th diffracted light flux satisfy w>v.

46. The optical pickup apparatus of claim 45,
wherein the diffraction orders of the w-th diffracted light flux and the v-th diffracted light flux satisfy w=2 and v=1.

47. The optical pickup apparatus of claim 45,
wherein the diffraction orders of the w-th diffracted light flux and the v-th diffracted light flux satisfy w=3 and v=2.

48. The optical pickup apparatus of claim 38,
wherein the multi-focal objective lens includes
a first area where a center-part light flux partially including the first and second light fluxes and including an optical axis passes through,
a second area where an outer-part light flux which is outer part of the center-part light fluxes passes through,
the multi-focal objective lens converges the first light flux passing through the first area and the second area onto an information recording surface of the first optical disc when recording and/or reproducing information on the first optical disc,
the multi-focal objective lens converges the first light flux passing through the first area onto an information recording surface of the second optical disc, and
makes the first light flux passing through the second area into a flare light which is not converged onto an information recording surface of the second optical disc when recording and/or reproducing information on the second optical disc, and
the multi-focal objective lens converges the second light flux passing through the first area onto an information recording surface of the third optical disc, and
makes the second light flux passing through the second area into a flare light which is not converged onto an information recording surface of the third optical disc when recording and/or reproducing information on the third optical disc.

49. An optical pickup apparatus for recording and/or reproducing information on a first optical disc having a protective layer with a thickness $t_1$,
a second optical disc having a protective layer with a thickness $t_2$ wherein $t_1 < t_2$,
a third optical disc having a protective layer with a thickness $t_3$ and being different kind of an optical disc from the first and second optical discs, and
a fourth optical disc having a protective layer with a thickness $t_4$ wherein $t_3 < t_4$, the optical pickup apparatus comprising:
a first light source for emitting a first light flux with a wavelength $\lambda_1$ wherein $\lambda_1 \leq 450$ nm, and for recording and/or reproducing information on the first and the second discs;
a second light source for emitting a second light flux with a wavelength $\lambda_2$ wherein 630 nm<$\lambda_2 \leq 680$ nm, for recording and/or reproducing information on the third disc;
a third light source for emitting a third light flux with a wavelength $\lambda_3$, wherein $\lambda_2 < \lambda_3$, for recording and/or reproducing information on the fourth disc,
a multi-focal objective lens for converging each of the first and second light fluxes onto an information recording surface of a corresponding optical disc among the first—fourth optical discs; and
an actuator for actuating the multi-focal objective lens in two directions for tracking and focusing the multi-focal objective lens;
wherein the multi-focal objective lens includes
a first optical surface including a first diffractive structure which has a plurality of ring-shaped zones divided by steps and generates a m-th diffracted light flux and a n-th diffracted light flux wherein m≠n, from the first light flux entering into the first diffractive structure, and
a second optical surface including a second diffractive structure which has a plurality of ring-shaped zones divided by steps and generates a v-th diffracted light flux from the second light flux entering into the second diffractive structure,
the multi-focal objective lens converges a diffracted light flux with one of the m-th diffraction order and the n-th diffraction order on an information recording surface of the first optical disc for recording and/or reproducing information of the first optical disc,
converges a diffracted light flux with another of the m-th diffraction order and the n-th diffraction order on an information recording surface of the second optical disc for recording and/or reproducing information of the second optical disc, and
converges a v-th diffracted light flux on an information recording surface of the third optical disc for recording and/or reproducing information of the third optical disc, and
converges the third light flux on an information recording surface of the fourth optical disc for recording and/or reproducing information of the fourth optical disc after the third light flux emitted by the third light source enters into the multi-focal objective lens as a diverging light flux.

50. The optical pickup apparatus of claim 49,
wherein when the first diffractive structure generates diffracted light fluxes from the first light flux entering into the first diffractive structure, diffracted light fluxes with a highest diffraction efficiency and a second highest diffraction efficiency among the diffracted light fluxes have the m-th diffracted light flux and the n-th light flux respectively.

51. The optical pickup apparatus of claim 49,
wherein a diffraction order m of the m-th diffracted light flux is integer and 1 or more, and
the diffraction order m and a diffraction order n of the n-th diffracted light flux satisfy n=m−1.

52. The optical pickup apparatus of claim 49,
wherein the plurality of ring-shaped zones of the first diffractive structure includes a step structure, and
the diffraction order m and a diffraction order n of the n-th diffracted light flux satisfy n=−m.

53. The optical pickup apparatus of claim 49,
wherein each of the plurality of ring-shaped zones of the second diffractive structure includes a step structure,
the step structure does not provide a phase difference to the first light flux and
provides a phase difference to the second light flux.

54. The optical pickup apparatus of claim 49,
wherein when the second diffractive structure generates diffracted light fluxes from the first light flux entering into the second diffractive structure, a diffracted light flux with a highest diffraction efficiency among the diffracted light fluxes is a w-th diffracted light flux and diffraction orders of the w-th diffracted light flux and the v-th diffracted light flux satisfy w>v.

55. The multi optical pickup apparatus of claim 49,
wherein the second light source and the third light source are arranged in one body by arranging so that the first light source and the second light source adjoin.

56. The multi-focal objective lens of claim 16,
wherein a thickness of a protective layer of the third optical disc is equal to a thickness of a protective layer of the second optical disc.

57. The optical pickup apparatus of claim 38,
wherein a thickness of a protective layer of the third optical disc is equal to a thickness of a protective layer of the second optical disc.

58. The optical pickup apparatus of claim 49,
wherein a thickness of a protective layer of the third optical disc is equal to a thickness of a protective layer of the second optical disc.

59. The multi-focal objective lens of claim 16 for use in an optical pickup apparatus for further recording and/or reproducing information on a fourth optical disc with a protective layer with a thickness $t_4$ wherein $t_2<t_4$ using a third light flux with a wavelength $\lambda_3$ wherein $\lambda_2<\lambda_3$, and
the multi-focal objective lens converges the third light flux on an information recording surface of the fourth optical disc for recording and/or reproducing information of the fourth optical disc after the third light flux emitted by the third light source enters into the multi-focal objective lens as a diverging light flux.

60. An optical information recording and/or reproducing apparatus comprising an optical pickup apparatus of claim 26.

61. An optical information recording and/or reproducing apparatus comprising an optical pickup apparatus of claim 38.

62. An optical information recording and/or reproducing apparatus comprising an optical pickup apparatus of claim 49.

* * * * *